US007421583B1

(12) United States Patent
Berson et al.

(10) Patent No.: US 7,421,583 B1
(45) Date of Patent: Sep. 2, 2008

(54) SYSTEM, METHOD AND ARTICLE OF MANUFACTURE FOR DETERMINING A PRICE OF CRYPTOGRAPH IC SERVICES BASED ON A COMPUTATIONAL BURDEN THEREOF

(76) Inventors: Thomas A Berson, 764 Forest Ave., Palo Alto, CA (US) 94301; R Drews Dean, 21070 White Fir Ct., Cupertino, CA (US) 95014; Matthew K Franklin, 334 Grant Ave., Palo Alto, CA (US) 94306; Teresa F Lunt, 892 Bruce Dr., Palo Alto, CA (US) 94303; Diana K Smetters, 952 Laguna Ave., Burlingame, CA (US) 94010

( * ) Notice: Subject to any disclaimer, the term of this patent is extended or adjusted under 35 U.S.C. 154(b) by 1826 days.

(21) Appl. No.: 09/596,924

(22) Filed: Jun. 19, 2000

(51) Int. Cl.
*H04L 9/00* (2006.01)
*H04L 9/32* (2006.01)
*H04L 9/28* (2006.01)
*H04K 1/00* (2006.01)

(52) U.S. Cl. .................. 713/170; 713/150; 713/151; 713/165; 713/189; 380/278; 380/255; 380/28; 705/52; 705/77; 705/80

(58) Field of Classification Search .................. 713/170; 705/51, 52
See application file for complete search history.

(56) References Cited

U.S. PATENT DOCUMENTS 5,123,045 A * 6/1992 Ostrovsky et al. ........... 713/190
5,159,633 A * 10/1992 Nakamura ................... 380/30
5,412,726 A * 5/1995 Nevoux et al. .............. 380/249
5,611,050 A * 3/1997 Theimer et al. ............. 709/202
5,673,316 A 9/1997 Auerbach et al. ............... 380/4
5,729,537 A * 3/1998 Billstrom .................... 370/329

(Continued)

FOREIGN PATENT DOCUMENTS

EP           0435094 A2 *   7/1991

(Continued)

OTHER PUBLICATIONS

Mayhew, Gregory, A Low Cost, High Speed Encryption System and Method, 1994, IEEE, pp. 147-154.*

(Continued)

*Primary Examiner*—Ayaz Sheikh
*Assistant Examiner*—Aravind K Moorthy
(74) *Attorney, Agent, or Firm*—Park, Vaughan & Fleming LLP

(57) ABSTRACT

A system, method and article of manufacture are provided for pricing a cryptographic service. A request for a cryptographic service is received. An identification is made of one or more of a computational burden required to perform the cryptographic service, a privacy level of the cryptographic service, and/or a speed of performing the cryptographic service. A price of the cryptographic service is determined based on the computational burden, privacy level, and/or speed. A method is also provided for pricing a cryptographic service based on a compactness of a cryptographic message. A request for encrypting a message is received. The message is encrypted and is also compressed during the encryption. An amount of compression of the message is determined. A price of the encryption is determined based on the amount of compression.

21 Claims, 17 Drawing Sheets

U.S. PATENT DOCUMENTS

| | | | |
|---|---|---|---|
| 5,790,664 A | 8/1998 | Coley et al. | 380/4 |
| 5,802,176 A | 9/1998 | Audebert | 380/23 |
| 5,862,220 A | 1/1999 | Perlman | 380/21 |
| 5,956,404 A | 9/1999 | Schneier et al. | 380/25 |
| 5,970,148 A * | 10/1999 | Meier | 713/168 |
| 5,991,399 A | 11/1999 | Graunke et al. | 380/4 |
| 5,995,625 A | 11/1999 | Sudia et al. | 380/25 |
| 6,049,613 A * | 4/2000 | Jakobsson | 380/47 |
| 6,055,508 A | 4/2000 | Naor et al. | 705/11 |
| 6,078,663 A | 6/2000 | Yamamoto | 380/9 |
| 6,249,866 B1 * | 6/2001 | Brundrett et al. | 713/165 |
| 6,269,157 B1 | 7/2001 | Coyle | 379/114 |
| 6,272,535 B1 * | 8/2001 | Iwamura | 709/217 |
| 6,304,915 B1 | 10/2001 | Nguyen et al. | 709/250 |
| 6,343,117 B1 * | 1/2002 | Bhagavath et al. | 379/93.02 |
| 6,363,150 B1 * | 3/2002 | Bhagavath et al. | 380/225 |
| 6,744,894 B1 * | 6/2004 | Saito | 380/277 |
| 6,832,316 B1 * | 12/2004 | Sibert | 713/181 |
| 6,990,468 B1 * | 1/2006 | Berson et al. | 705/52 |
| 7,051,199 B1 * | 5/2006 | Berson et al. | 713/150 |

FOREIGN PATENT DOCUMENTS

| | | |
|---|---|---|
| EP | 0 736 827 A2 | 10/1996 |
| EP | 1580945 A2 * | 9/2005 |
| WO | WO 98/42098 | 9/1998 |
| WO | WO 98/52316 | 11/1998 |

OTHER PUBLICATIONS

Dai et al, Comparing and contrasting micro-payment models for E-commerce systems, 2001, IEEE, pp. 35-41.*

Mayhew, Gregory, A Low cost, High Speed Encryption System and Method, 1994, IEEE, pp. 147-154.*

Anderson, Ross, Cost Estimates, 1997, pp. 1-2.*

Anonymous, Configuring Data Encryption Services, 1999, Nortel Networks, whole document.*

Gwennap, Linley, Encryption Costs Tumble, 2001, Electronic Engineering Times, p. 47.*

* cited by examiner

SYSTEM, METHOD AND ARTICLE OF MANUFACTURE FOR DETERMINING A PRICE OF CRYPTOGRAPHIC SERVICES BASED ON A COMPUTATIONAL BURDEN THEREOF

BACKGROUND OF THE INVENTION

Communications take place over many different types of channel media such as wireline, radio frequency, fiber optic, and the like. The communications carried over each of these media are, however, subject to interception (commonly referred to as "eavesdropping"). In instances where a communication concerns sensitive or proprietary information, it is common for the parties to the communication to employ a security protocol (such as encryption or scrambling) in order to prevent the eavesdropper from being able to discover the communicated information.

In encryption, a plaintext message is encrypted by a sender into a ciphertext message using a key (cryptovariable) and then sent over a communications channel. A receiver then decrypts the communications channel transmitted ciphertext message using the same key. An eavesdropper, who presumably does not have access to the key, cannot decrypt the transmitted ciphertext message to recover the plaintext message. Any sensitive or proprietary information contained within the plaintext message is thus safely communicated.

It is not unusual for the sender and receiver to be located at a considerable distance from each other. In such cases, a number of problems arise in ensuring that the designated key necessary for decryption is securely communicated to the receiver. A secure channel, such as a courier service, may be used to communicate the key. However, such channels tend to be expensive, slow, and perhaps even unsecured in instances where the trustworthiness of the courier is compromised.

To address this problem of key distribution, public key methods have been developed for security protocols wherein a sender and receiver may independently determine a common secret key by exchanging information based on secret parameters known only to them. The information that is exchanged is known as "public keys", and although subject to intervention the common secret key cannot be determined by the eavesdropper without having access to the secret parameters. One such well known public key encryption scheme is the Diffie-Hellman algorithm. See, U.S. Pat. No. 4,200,770, to Hellman, et al. and U.S. Pat. No. 4,218,582, to Hellman, et al.

Key and Encryption Technology

In a public key encryption scheme, cryptographic keys occur in pairs: one of the pair is a private key that is kept confidential, and the other of the pair is a public key that can be made available to anyone. When data is encrypted using one of the keys (either the public key or the private key), the other key must be used to decrypt the data. For example, resource A encrypts data using a private asymmetric cryptographic key belonging to A. Resource A makes the corresponding public asymmetric cryptographic key available publicly. The only key that can properly decrypt the data is the public key corresponding to the private key with which the data was encrypted. When resource B receives the data, it uses resource A's public key to decrypt the data. If the data decrypts properly, resource B is certain that only resource A, the sole holder of the corresponding private key, could have encrypted the data. In this way, resource B knows that the data must have originated from resource A, i.e., that the data purportedly from resource A is authentic.

Due to the prolific use of encryption to protect data, new methods are needed to allows users to tailor encryption needs to their particular purposes. However, these needs must be balanced with an encryption provider's costs of providing such flexible encryption technology and resources. Therefore, what is needed is a system that allows the user to specify encryption parameters while compensating the encryption provider for enabling and providing such flexible service.

SUMMARY OF THE INVENTION

A system, method and article of manufacture are provided for pricing a cryptographic service. A request for a cryptographic service is received from a user, which can be a person, business, computer executing a computer program, etc. An identification is made of one or more of a computational burden required to perform the cryptographic service, a privacy level of the cryptographic service, and/or a speed of performing the cryptographic service. A price of the cryptographic service is determined based on the computational burden, privacy level, and/or speed. Further, payment for the cryptographic service can be requested and received from the user.

Preferably, the user requesting the cryptographic service specifies the privacy level and/or the speed of performing the cryptographic service. In one aspect of the present invention, the cryptographic service includes sending a plurality of undesired queries with a desired query. In another aspect of the present invention, the cryptographic service includes utilizing group authentication. In a further aspect of the present invention, the cryptographic service includes hiding message traffic of a user among a plurality of messages of other users.

A method is also provided for pricing a cryptographic service based on a compactness of a cryptographic message. A request for encrypting a message is received. The message is encrypted and is also compressed during the encryption. As an option, the encryption can utilize random bits. An amount of compression of the message is determined. A price of the encryption is determined based on the amount of compression.

BRIEF DESCRIPTION OF THE DRAWINGS

The foregoing and other objects, aspects and advantages are better understood from the following detailed description of a preferred embodiment of the invention with reference to the drawings, in which.

DESCRIPTION OF THE PREFERRED EMBODIMENTS

A preferred embodiment of a system in accordance with the present invention is preferably practiced in the context of a computer such as an IBM compatible computer, Apple Macintosh computer or UNIX based system. One of ordinary skill in the art will readily comprehend that routers, switching hardware and digital telephony systems provide the necessary computing capacity for hosting a preferred embodiment. A representative hardware environment is depicted in FIG. 1, which illustrates a typical hardware configuration of a workstation in accordance with a preferred embodiment having a central processing unit 110, such as a microprocessor, and a number of other units interconnected via a system bus 112.

Figure 1:
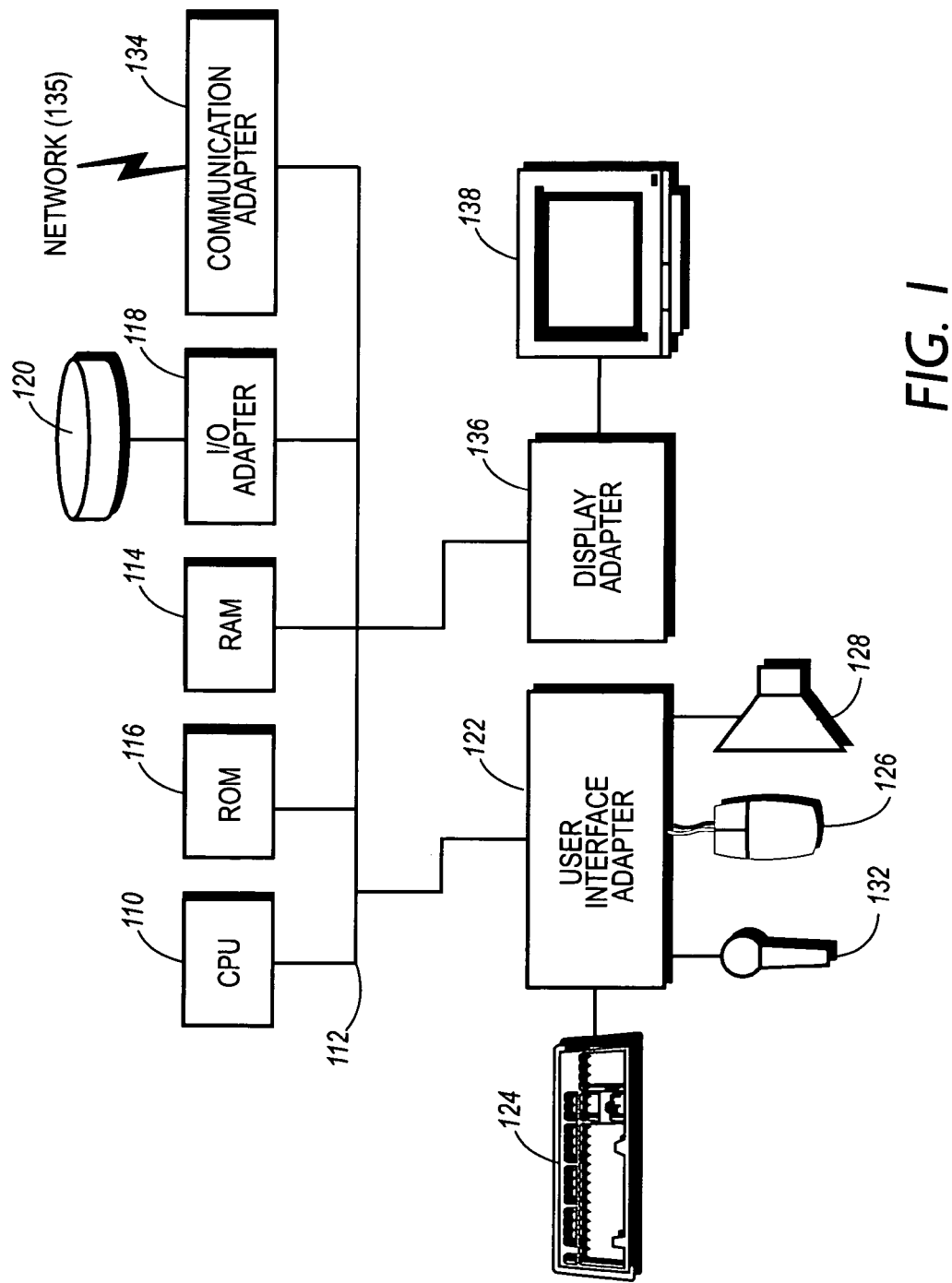
FIG. 1 illustrates a representative hardware environment in accordance with one embodiment of the present invention.

The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, and/or other user interface devices such as a touch screen (not shown) to the bus 112, communication adapter 134 for connecting the workstation to a communication network 135 (e.g., a data processing network) and a display adapter 136 for connecting the bus 112 to a display device 138. The system also has crypto hardware incorporated into the architecture.

The workstation typically has resident thereon an operating system such as the Microsoft Windows NT or Windows/ 95 Operating System (OS), the IBM OS/2 operating system, the MAC OS, or UNIX operating system. Those skilled in the art will appreciate that the present invention may also be implemented on platforms and operating systems other than those mentioned. A preferred embodiment is written using the C and C++ languages and utilizes object oriented programming methodology.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

Objects can represent an inventory, such as a personnel file or a table of the latitudes and longitudes of cities.

Objects can represent user-defined data types such as time, angles, and complex numbers, or points on the plane.

Objects can encapsulate keys, hardware, protocol, cryptographic accelerators and other cryptographic entities.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

A cryptoserver in accordance with a preferred embodiment is implemented in C++. One of ordinary skill in the art will readily comprehend that Java could have been used as an enabler, however, there are some enhancements to Java that are required to provide appropriate infrastructure. These enhancements, provided in accordance with a preferred embodiment, address problems including: lack of suitable middleware, poor performance characteristics of present Java compilers, difficulty of efficient interfacing to vendor libraries written in the C programming language, and a lack of a complete Unix system call interface.

In order to simplify the cryptoserver, "shim" libraries are utilized to normalize the interface the server utilizes to interface to the heterogeneous cryptographic hardware accelerators utilized in accordance with a preferred embodiment. This architecture allows the removal from the server of any task-specific logic yet compensates for any differences in feature support between various accelerator drivers and a common interface presented to cryptoserver clients. For example, the shim libraries were necessary to normalize byte order, handle support for negative numbers, handle exponents greater than the modulus and similar tasks. Many hardware accelerators have intermittent or no support for such inputs since they do not occur when utilizing standard RSA. However, as technologies like the cryptoserver reduce the cost of modular exponentiations, cryptographic algorithms and protocols considered too costly and complex for practical use will be used, and these algorithms will require feature shims in accordance with the preferred embodiment. Each hardware "shim" is responsible for any initialization required by the hardware it manages, and can provide information to the server about the capabilities of that hardware. This information is utilized by the server for sophisticated scheduling of work items on particular accelerators.

Figure 1A:
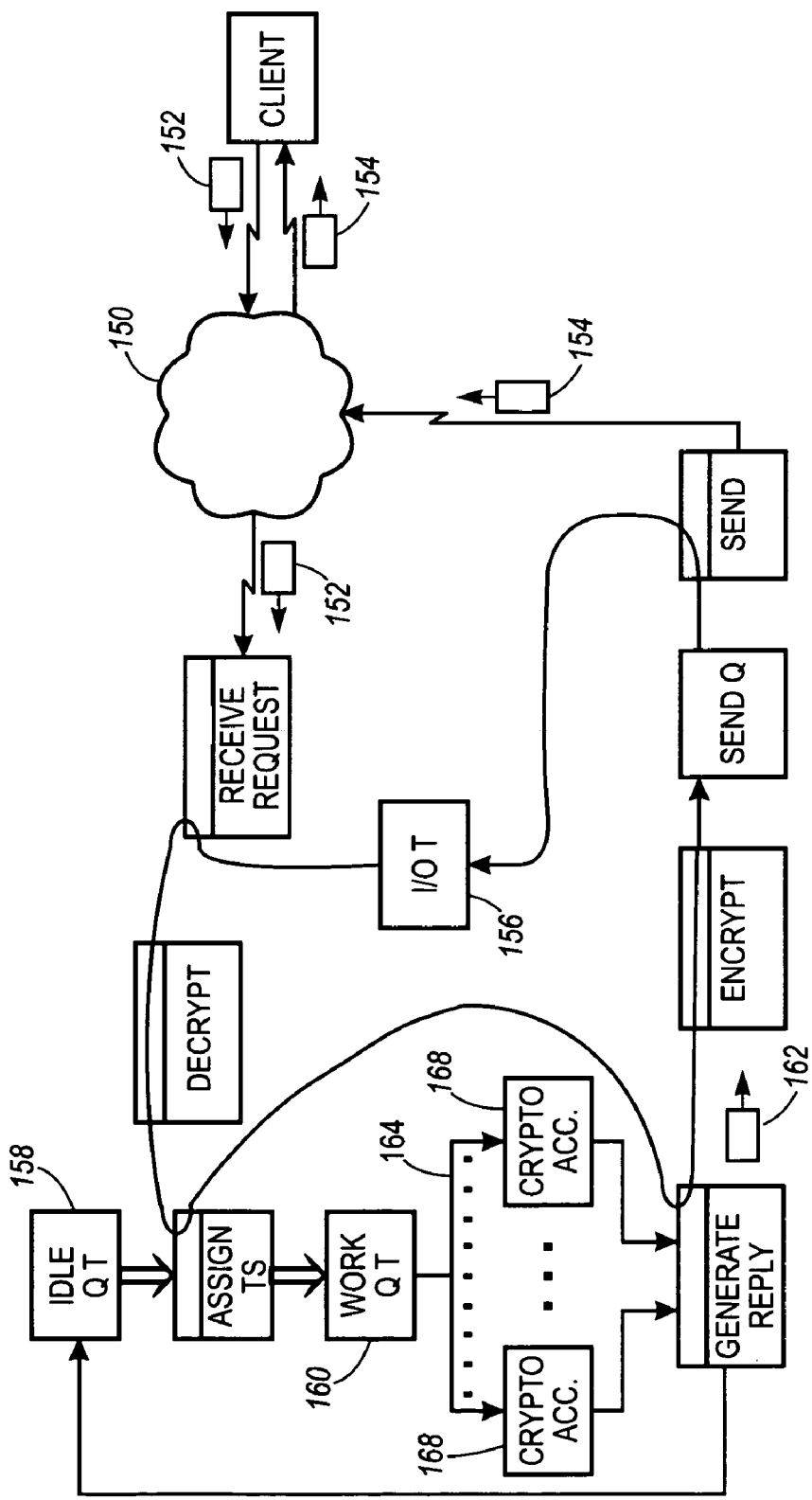
FIG. 1A is a block diagram of a cryptoserver architecture in accordance with a preferred embodiment.

In order to make effective use of the hardware and maximize scalability, the number of threads on the cryptoserver can be configured to manage each cryptographic accelerator. This is varied based on the inherent parallelism of each accelerator board, the architecture of the driver and any vendor libraries used to interface with the accelerator board. The server has a default allocation of one thread per cryptographic processing unit. The server also allocates a set number of threads for the Remote Procedure Call (RPC) subsystem. A number of work items are preallocated into an idle queue. Then, as cryptographic requests arrive, they are decrypted and placed in a work item which is moved onto the work queue. After the cryptographic accelerator has processed the request, the work item is moved onto the reply queue and the reply is encrypted before it is transmitted. Multiple threads are utilized to process requests and replies to prevent either stage from becoming a bottleneck. FIG. 1A is a block diagram of a cryptoserver architecture in accordance with a preferred embodiment. A client accesses the cryptoserver through the internet 150 or other communication device with a request 152 which is intercepted by one of the request handler threads 156 and placed on the idle queue 158 for processing by the work queue 160 and ultimate input to the cryptographic accelerator 168. Information accompanying the request is used to determine the number of worker threads 164 assigned to process the cryptographic request as discussed above. Moreover, the particular characteristics of the cryptographic accelerator are normalized utilizing one or more "shim" as discussed above. A reply 162 is generated by the worker threads 164 and one or more of the reply handler threads 156 are used to generate the reply 154 transmission which is returned via the internet 150 or other communication facility.

An additional optimization in accordance with a preferred embodiment allows the RPCs to receive array arguments that are broken down into multiple work items as they are placed on the work queue 160. This enables the separate operations to occur in parallel in accordance with a preferred embodiment. The RPC cannot return results until all of the parallel threads have completed, so one of the work items is canonical per RPC request and no canonical work item is moved onto the reply queue until all of the operations are completed.

Figure 1B:
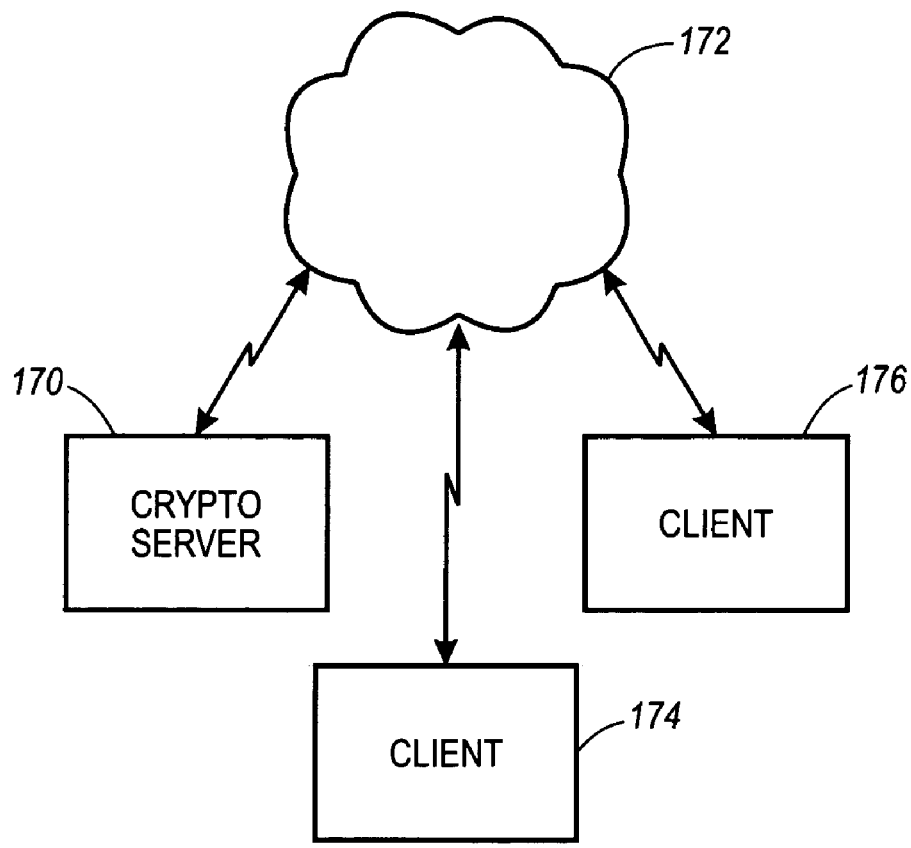
FIG. 1B illustrates a cryptographic network architecture in accordance with a preferred embodiment.

In accordance with a preferred embodiment, the cryptoserver utilizes generally available hardware. The customization aspects in accordance with a preferred embodiment are performed in software. However, one of ordinary skill in the art will readily comprehend that hardware could be utilized to customize or optimize various aspects without departing from the spirit and scope of the claims. A Sun Ultra-10 workstation running Solaris 7 with an Atalla AXL200 accelerator is utilized in accordance with a preferred embodiment. The AXL200 has a maximum throughput of 267, 1024-bit private key RSA operations per second. As discussed above, the architecture of the software utilizes "shims" to normalize the differences in the accelerator hardware. The Sun workstation was selected because several cryptographic accelerator vendors support Solaris on SPARC hardware. The cryptoserver can be enhanced to utilize a multiprocessor to more efficiently handle independent cryptographic requests in parallel. FIG. 1B illustrates a cryptographic network architecture in accordance with a preferred embodiment. A cryptography server 170 attaches to the internet 172 or other communication medium to enable clients 174 & 176 to send and receive information to be encrypted or decrypted. Symmetric cryptographic acceleration hardware 178 is utilized to speed the encryption of client cryptoserver communication. This hardware is particularly useful for DES or triple-DES operations. Faster block ciphers are effectively accommodated in software utilized in conjunction with the hardware. In addition, multiple public key accelerators can be used in parallel to facilitate a dramatic throughput increase.

Figure 1C:
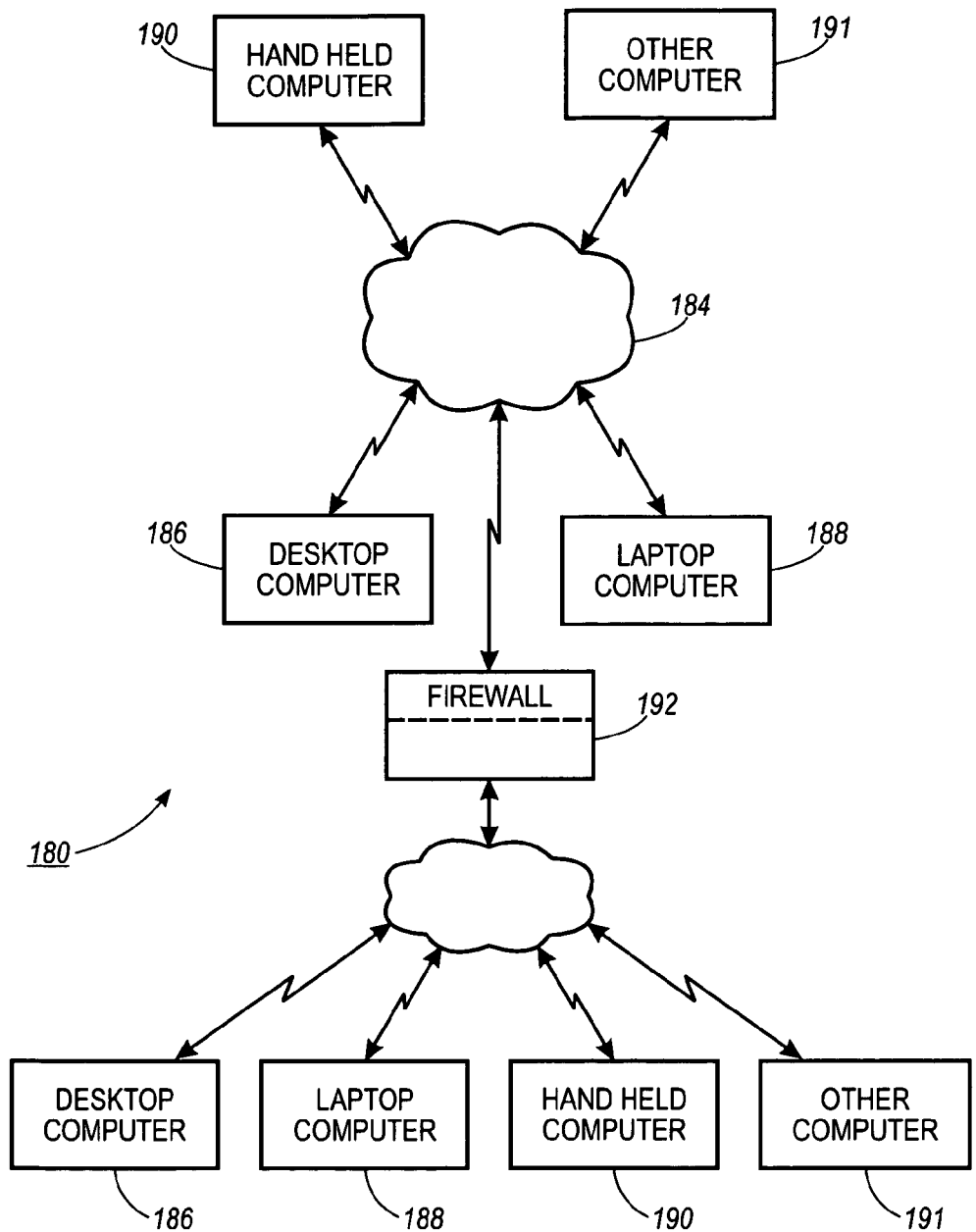
FIG. 1C illustrates an illustrative system with a plurality of components in accordance with one embodiment of the present invention.

FIG. 1C illustrates an exemplary system 180 with a plurality of components 182 in accordance with one embodiment of the present invention. As shown, such components include a network 184 which take any form including, but not limited to a local area network, a wide area network such as the Internet, etc. Coupled to the network 184 is a plurality of computers which may take the form of desktop computers 186, lap-top computers 188, hand-held computers 190, or any other type of computing hardware/software 191. As an option, the various computers may be connected to the network 184 by way of a server 192 which may be equipped with a firewall for security purposes. It should be noted that any other type of hardware or software may be included in the system and be considered a component thereof.

Software Architecture

A software architecture in accordance with a preferred embodiment scales effectively based on the following variables, including the number of client requests, the amount of cryptographic hardware available and the number of individual clients (security associations) being managed and utilized. The architecture in accordance with a preferred embodiment is designed so that individual client requests must have low overhead, both in terms of network operations and security association management. Infrequent operations such as security association negotiation may be more expensive to compensate. Additional cryptographic acceleration capability can be added easily to take advantage of different types of cryptographic accelerators. Finally, the software is extensible to support different mechanisms for negotiating security associations and protecting requests on the wire.

Middleware

A preferred embodiment was implemented utilizing Sun's Transport Independent Remote Procedure Call (TI-RPC) middleware. This software enables multithreaded applications for scalable service. TI-RPC also supports the Generic Security Service (GSS) Application Programming Interface (API) that provides multiple authentication and encryption technologies for negotiating long-term security associations, and it supports datagram transports such as UDP. A datagram is an independent, self-contained message sent over the network whose arrival, arrival time, and content are not guaranteed. Datagrams are used because they comply with the RPC paradigm better than connection-oriented transports such as TCP and because a datagram based solution obviated the requirement for complicated connection pool management logic. The connection pool management logic becomes very complex as the number of clients exceeds the number of socket descriptors available in a single Unix process. Datagrams also minimize transport-related overhead for clients who may make infrequent calls to the cryptoserver. One of ordinary skill in the art will readily comprehend that other middleware choices, most notably CORBA, could be used without departing from the scope and spirit of the claims.

A major attraction of this middleware is the availability of RPCSEC.GSS which provides an interface to the GSSAPI. GSSAPI is a pluggable security API which provides a consistent interface to a variety of different authentication and encryption technologies. It is one of the few security technologies to explicitly support negotiation of security associations over connectionless transport that is capable of securing communication over such transports. Most importantly, RPCSEC.GSS provides features essential to providing long-term security associations to secure RPC-based requests with a minimum of per-request overhead. Another substantial advantage of TI-RPC is that it is compatible on the wire with Sun's ONC RPC, a widely deployed RPC protocol that is at the heart of NFS. As such, ONC RPC implementations are available on a wide variety of platforms.

Security Association Negotiation

There are a variety of approaches to generating security associations between a client and a cryptoserver in accordance with a preferred embodiment. The simplest is a pure key agreement protocol (e.g. Diffie-Hellman) to produce a shared symmetric key used to encrypt further communication between a client and a server. In a production server in accordance with a preferred embodiment, session keys will be generated every one to twenty-four hours per client in actual use. If the keys expire uniformly across an hour, even with 10,000 clients and one hour session expirations, this implies three key agreements, with associated modular exponentiations, per second, or one percent of the capacity of a single AXL200. To produce the benchmark numbers discussed below, a 192-bit Diffie-Hellman key agreement mechanism was utilized which is distributed with N-RPC. For a symmetric cipher in accordance with a preferred embodiment, triple DES is utilized. Using triple-DES is a very conservative choice, as almost all other ciphers will offer better performance.

Other approaches to negotiating security associations have also been explored. For a preferred embodiment, a client must have assurance that the machine is communicating with a trustworthy cryptoserver. Therefore, the server must be able to authenticate itself to the client. If the service is freely given, the client need not authenticate itself to the server. In order to provide this base level of functionality, a public key based GSS mechanism and a certification authority trusted by all clients is utilized to certify the cryptoserver. Alternative embodiments for authentication mechanisms utilize client authentication to control access to a cryptoserver. PKI-based or Kerberos-based authentication mechanisms can identify clients authorized to use the cryptoserver. Forms of digital cash can be used to allow clients to pay for cryptographic operations by both number of operations or quality of service (speed, latency, etc.) as described below. Thus, clients could set up an account as part of security association negotiation, or could include payment tokens on a per-request basis.

Client Interface to the Cryptoserver

The client interface to the cryptoserver in accordance with a preferred embodiment is designed to allow sophisticated clients to utilize one or more servers while minimizing network-related overhead, and to make it easy to incorporate cryptoserver support into legacy client packages. The interface is also designed to allow requests to pass through to the cryptographic hardware with as few copy operations as possible, and to be broken up in various ways to interface efficiently to heterogeneous accelerator hardware incorporated into the cryptoserver.

The interface to the cryptoserver is written in Sun's rpcgen RPC specification language. Here is an example of the code with non-essential details about data types and benchmarking support removed.

```
Program QCS_RPC_PROG {
  Version QCS_RPC_VERS {
    QCS_value_res RPCMODEXP (QCS_mod_exp_coef, QCS_bignum)=1;
    QCS_val_arrary_res RPCMODEXPARRAY (QCS_mod_exp_coef, QCS_bignum_array)=2;
    QCS_value_res RPCRSAPCRTEXP (QCS_rsa_private_key, QCS_bignum)=3;
    QCS_val_array_res RPCRSACRTARRAY (QCS_rsa_private_key, QCS_bignum_array)=4;
    QCS_val_array_res RPCMULTIMODEXPARRAY (QCS_mod_exp_coef_array, QCS_bignum_array)=5;
    int RPCGETMAXMODULUSLEN(void)=7;
  }=1;
}=0x20000105;
```

In the above example, RPCMODEXP is a simple modular exponentiation. RPCMODEXPARRAY provides a more efficient way to encrypt multiple values with the same key. RPCRSAPCRTEXP and RPCRSACRTARRAY are the corresponding calls, but using Chinese Remaindered exponentiation. Finally, RPCMULTIMODEXPARRAY provides a more communication efficient mechanism for raising multiple bases to multiple powers (modulo the corresponding moduli).

Figure 2:
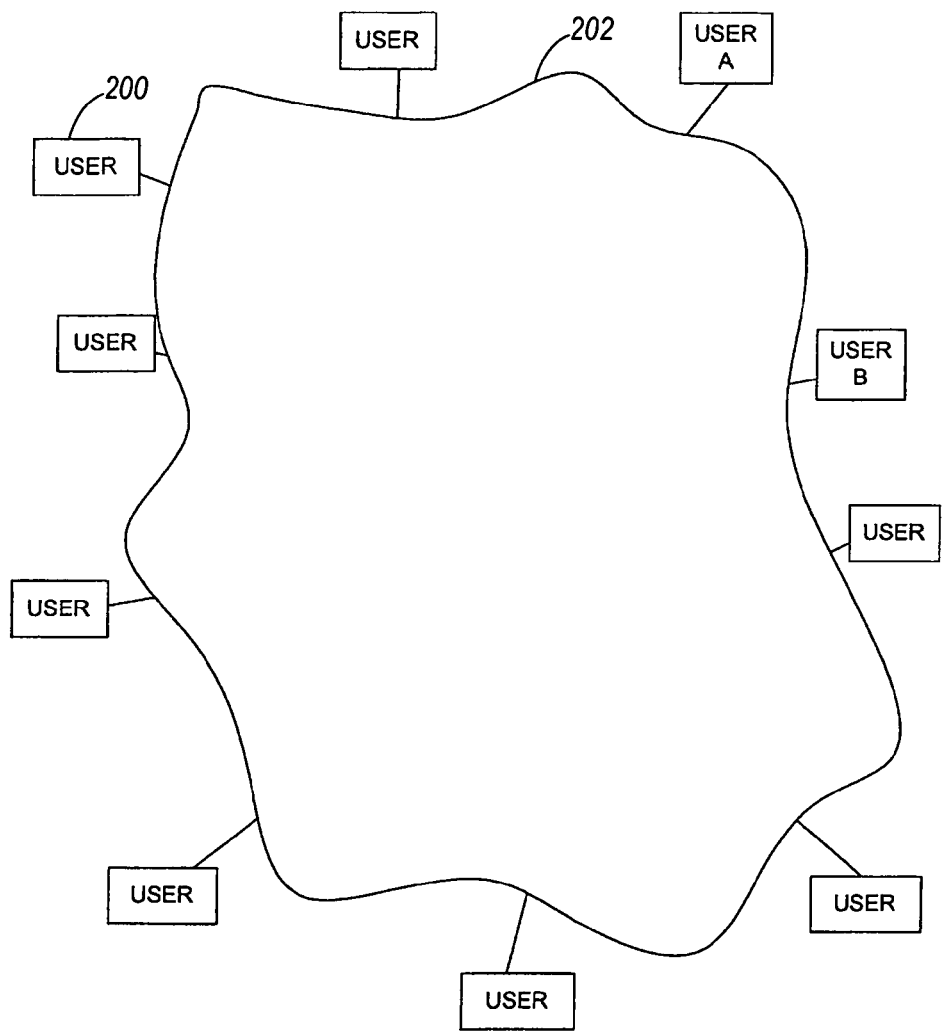
FIG. 2 is a schematic diagram illustrating a network of computers similar to that shown in FIG. 1 in accordance with a preferred embodiment.

FIG. 2 is a schematic diagram illustrating a network of computers similar to that shown in FIG. 1, wherein a plurality of users 200 interacts in the context of the present invention over a network 202 such as the Internet. In a typical scenario, users 200 perform public and private key cryptography to achieve confidential communications over the network 202. As noted earlier, hybrid systems include an asymmetric public key distribution and a plurality of symmetric private key transactions associated therewith.

Figure 3:
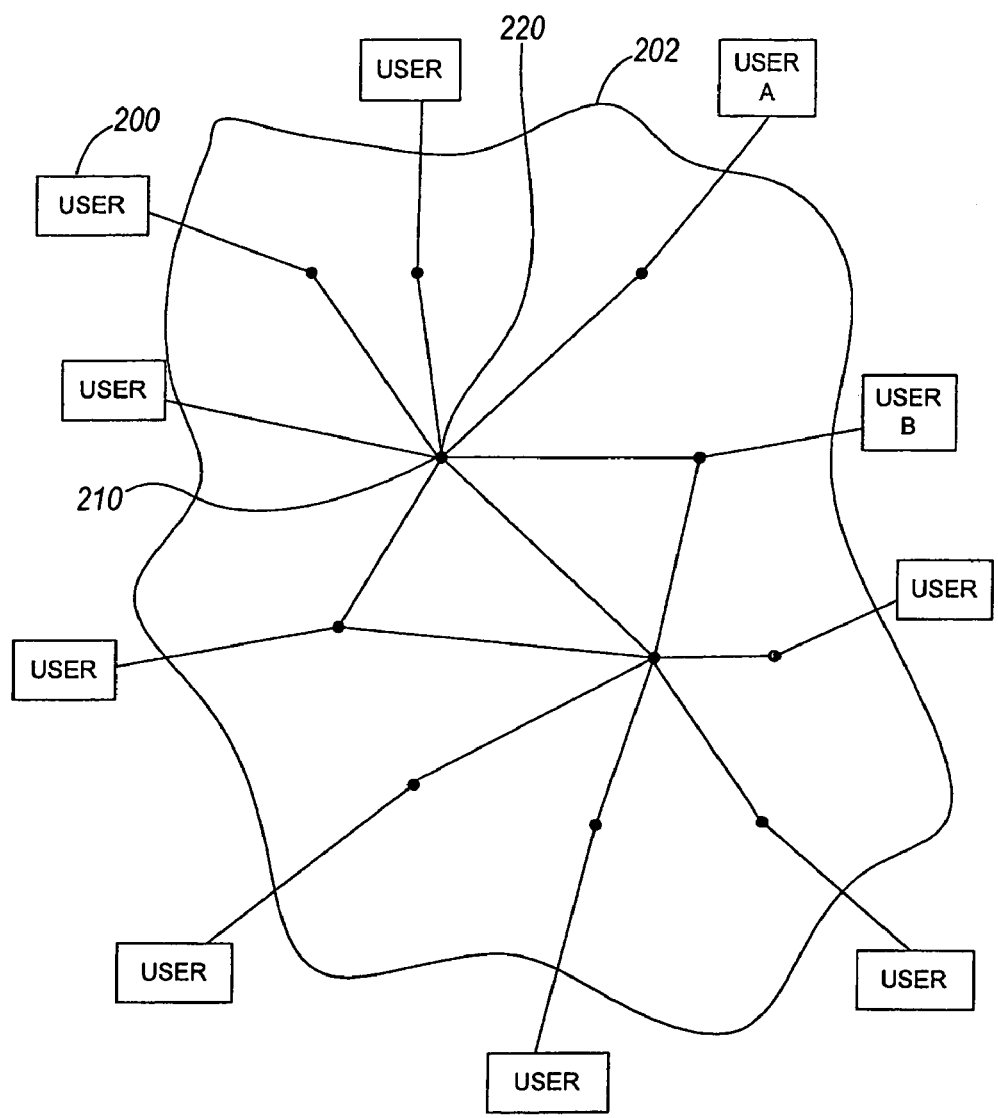
FIG. 3 is a schematic diagram illustrating the nodes of the network of computers shown in FIG. 2 in accordance with a preferred embodiment.
Figure 4:
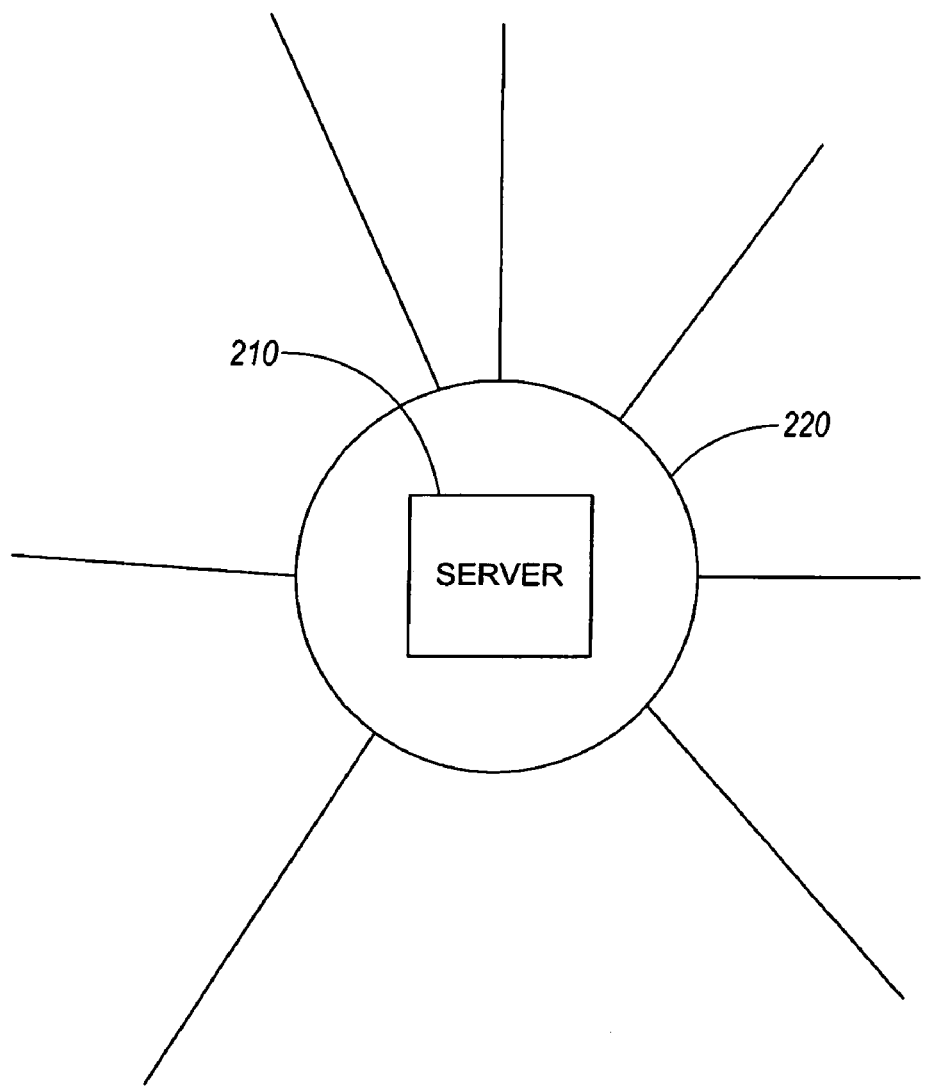
FIG. 4 is a schematic diagram illustrating a node of the network of computers shown in FIG. 2 in accordance with a preferred embodiment.

With reference to FIGS. 3 and 4 and in an embodiment of the present invention, a cryptographic server 210 is located at a fast and well-connected node 220 on the network 202. The cryptographic server 210 includes means for performing CPU intensive cryptographic computations. The cryptographic server 210 may include special purpose hardware devices for performing such operations. The cryptographic server 210 may be preferably located at a high traffic node on the network 202 to reduce network latencies and to thereby provide faster turn around time to requests for cryptographic computations from users.

In an illustrative embodiment of the present invention, a user wishes to have the capability of performing high speed cryptographic computations to service its customers. The user contracts or otherwise arranges with the operators of cryptographic server 210 to perform cryptographic computations at the cryptographic server 210. In another aspect of the invention, the user pays a fixed fee to the operators of cryptographic server 210 in exchange for cryptographic computations. In a further aspect of the invention, the user pays the operators of cryptographic server 210 on a per use basis.

Figure 5:
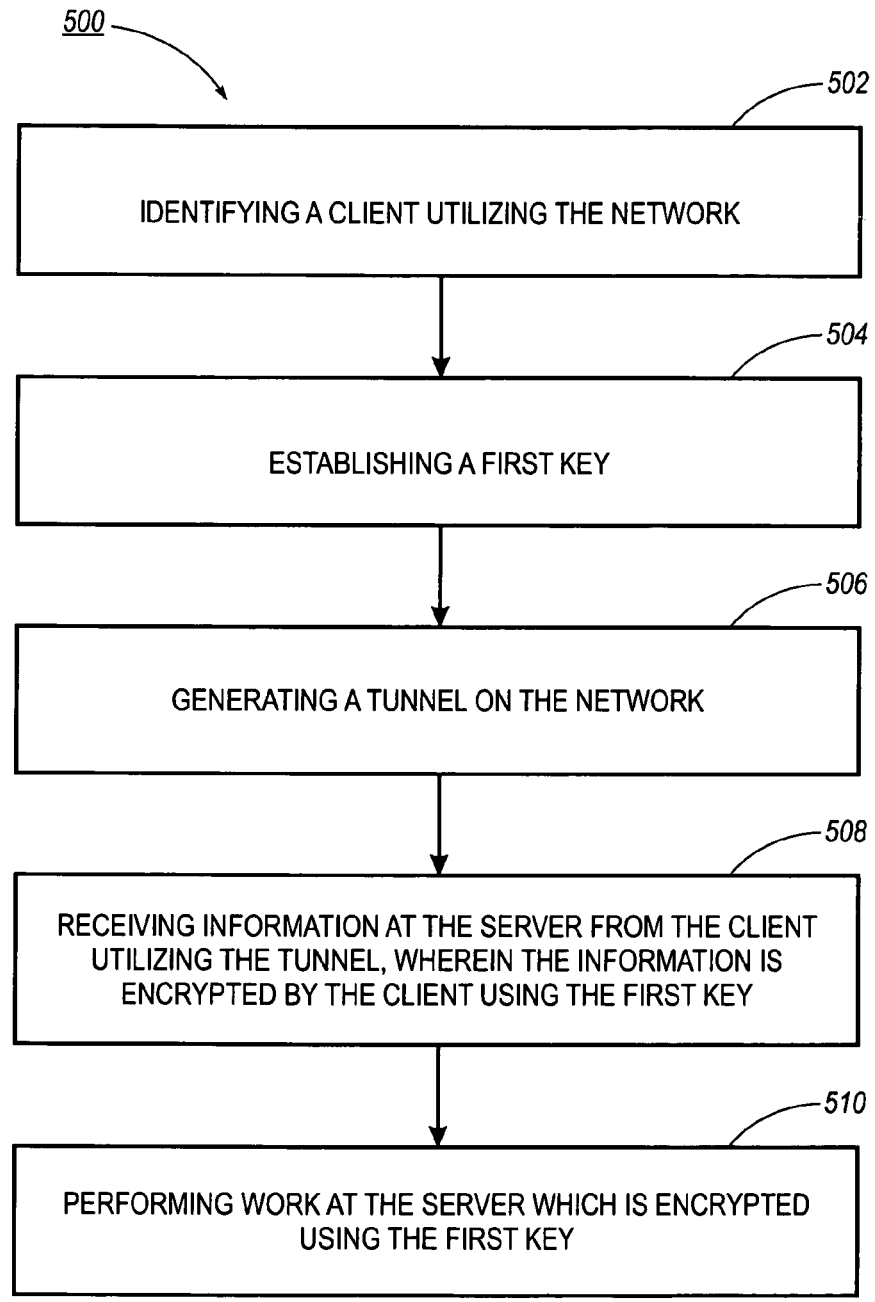
FIG. 5 is a flowchart for a process for providing a cryptographic service utilizing a network in accordance with an embodiment.

FIG. 5 is a flowchart of a process 500 for providing a cryptographic service utilizing a network in accordance with an embodiment of the present invention. Initially, in operation 502, a client is identified by a server utilizing the network. The client may include a computer such as that shown in FIG. 1, or any computing mechanism. In another exemplary embodiment of the present invention, the client may include a printer (or a digital copier, etc.) so that the printer, etc. may be able to digitally sign its own output on the fly without expensive cryptographic hardware.

A first key is then established in operation 504. In one embodiment of the present invention, the first key may comprise an encryption key for a symmetric cipher or an asymmetric cipher. The establishment of the first key may be accomplished by exchanging messages between the server and the client. In the alternative, the key may simply be stored in a database or the like. It should be understood that first key may be established in any desired manner.

In operation 506, a tunnel is generated on the network. Thereafter, information is received at the server from the client utilizing the tunnel, as indicated in operation 508. Such information is encrypted by the client using the first key. At the server, cryptographic work is performed. See operation 510. The work may include cryptographic services such as modular exponentiation. In such embodiment, Equation #1 may be employed.

$$m^e \mod n, \text{ where}$$

$$m = \text{message}$$

$$e, n = \text{key} \quad \text{Equation \#1}$$

After the work has been performed, the work results may be encrypted using the first key and sent to the client where it may be decrypted by the client using the first key. A second key comprising at least one parameter for the work performed by the server, such as keys, messages and cyphertext can also be sent to the server. In terms of a business model, payment for the cryptographic service may be based upon a fixed fee. In another aspect of the invention, payment is based upon a per operation payment system. In yet another aspect of the invention, payment is based upon a combination of a fixed fee and a per operation payment system.

Figure 6:
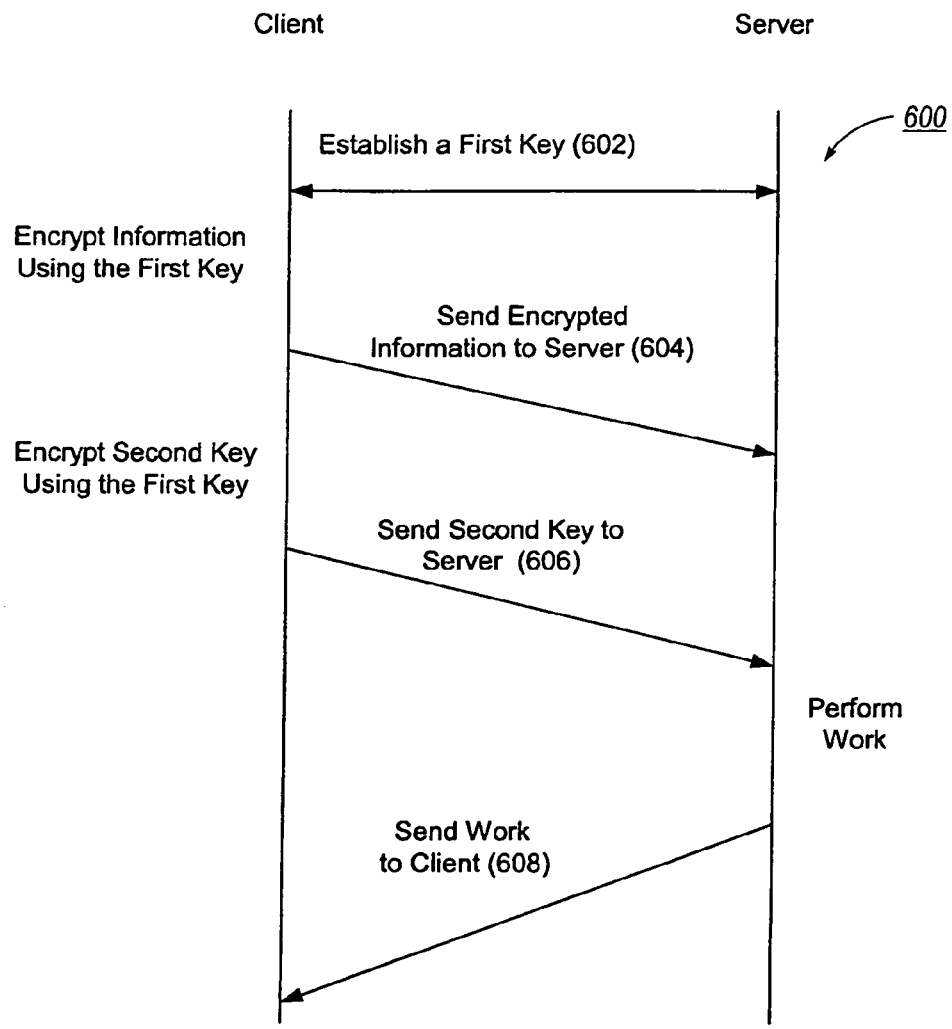
FIG. 6 is a diagram illustrating the exchange of information between the client and the server in accordance with the method set forth during reference to FIG. 5.

FIG. 6 is a diagram illustrating the exchange of information 600 between the client and the server in accordance with the method set forth during reference to FIG. 5. As shown, the first key is initially established between the client and server in operation 602. Thereafter, in operation 604, information is received at the server from the client. As set forth earlier, such information is encrypted by the client. A second key also can be sent to the server from the client in operation 606. Once the work has been performed, it is sent to the client from the server in operation 608. In an alternative embodiment, a cryptographic server could be located in a user's server pool, thereby providing for reduced network latency. The management of the cryptographic server would preferably be outsourced.

The present inventors calculate that in the near future a standard workstation equipped with special purpose cryptographic calculation devices is able to perform 4000 1024-bit RSA operations per second at a complete hardware cost of $7000. Support for 4000 1024-bit RSA operations per second requires approximately 12 Mbits per second of network bandwidth. It is estimated that obtaining this bandwidth at a well-connected traffic aggregation node such as node 220 would cost approximately $5000 per month. On a smaller scale, 800 1024-bit operations per second would require 2.4 Mbits per second of network bandwidth at a cost of $1500 per month.

If hardware costs and one-time costs are amortized, it is estimated that a total monthly cost of $6350 for 4000 RSA operations per second and $3350 for 800 RSA operations per second can be achieved. There are 2,592,000 seconds in a month so the cost per cryptographic operation is $6 \times 10^{-6}$ cents at 4000 operations per second and $1.5 \times 10^{-4}$ cents at 800 operations per second.

Benchmarks

A microbenchmark that performed a modular exponentiation using the Atalla-supplied libraries and compared the results to the correct value was written. The same computation was executed on a client of the cryptoserver in accordance with a preferred embodiment. The single threaded case reports are presented below both with and without securing the wire with triple DES. The numbers are reported as averages and in all cases the variance was negligible.

| MACHINE | THREADS | LATENCY (ms) | OPERATIONS/SEC |
|---|---|---|---|
| Local accelerator | 1 | 91.5 | 10.9 |
| Remote crypto (unsecure) | 1 | 92.0 | 10.9 |
| Remote crypto (secure) | 1 | 93.4 | 10.7 |

Without encryption, our software delivers full throughput of the accelerator. Adding triple-DES incurs a 2% reduction in throughput. While the single threaded numbers show that the AXL200 has a large latency, it has 24 modular exponentiators that can run in parallel. Many applications of the cryptoserver (e.g., supporting SSL) are more concerned with throughput than latency. For the cross machine cases, the client is configured to make requests across fifty threads.

| MACHINE | THREADS | OPERATIONS/SEC |
|---|---|---|
| Local accelerator | 24 | 261 |
| Local accelerator | 40 | 265 |
| Remote crypto (unsecure) | 24 | 259 |
| Remote crypto (secure) | 24 | 259 |
| Remote crypto (unsecure) | 40 | 265 |
| Remote crypto (secure) | 40 | 265 |

Note that although 24 threads should be enough to saturate the AXL200, in practice it is not. Adding threads above 40 does not result in increased performance. Also note that the exponent has a weight of 511 (i.e., there are 511 "1" bits in the exponent), and the time per operation depends on the weight of the exponent. The important point to note is that the penalty for using a cryptoserver is minimal to non-existent.

Alternative Embodiments

Viewing cryptography as a network service changes all the rules regarding the cost of cryptography. Then, since cryptography is not computationally prohibitive, it is much more convenient to incorporate into applications. Applications using abundant public key operations including secure communication services for dynamic coalitions, private database retrieval and other applications in which cryptographic services naturally fit are enabled since the cost is no longer prohibitive. Cryptoserver client support for standard cryptographic APIs are also supported utilizing this novel architecture. In accordance with a preferred embodiment, each request includes the client's private key. Alternatively, if the cryptoserver already knows the client's private key, then the request may include an authentication token that demonstrates who the request is coming from and that the request is fresh. This capability would require a more trustworthy cryptoserver, but it would reduce the bandwidth required for the network by nearly half.

Although we need to trust the cryptoserver with the private key, we do not need to trust the cryptoserver with the message or ciphertext to be processed. These can be protected by a method known as blinding, which is a pre-processing step (e.g., randomization) compatible with the cryptographic operation to be performed. After the results of the cryptographic operation on the blinded data are returned, the user can perform a corresponding post-processing step to unblind them. This is particularly efficient for RSA signatures with low exponent, but it is useful in many other cases as well.

Since the server supports a heterogeneous collection of hardware accelerators running concurrently, it would be a simple modification to use one accelerator to double check the results delivered by another accelerator. By using different accelerators, a single accelerator could not produce a doctored result along with a doctored inverse check result. The tradeoff between paranoia and throughput could be easily managed by checking a user-selectable fraction of results. By selecting hardware accelerators designed and manufactured in disjoint countries, no single government would be in a position to compromise an RSA operation. Such a system would be highly resistant to attacks, including fault injection. Similarly, clients could issue RPCs to more than one server. One could, for example, use servers operated by different organizations, or servers located in multiple countries.

A preferred embodiment has been discussed that enables public key cryptography as a service offered over untrusted networks. This architecture has been shown to offload work from clients, provide greater utilization of cryptographic accelerators by sharing them among many clients, and it has acceptably small performance overhead. In addition, it enables new security applications that were previously considered too costly.

Figure 7:
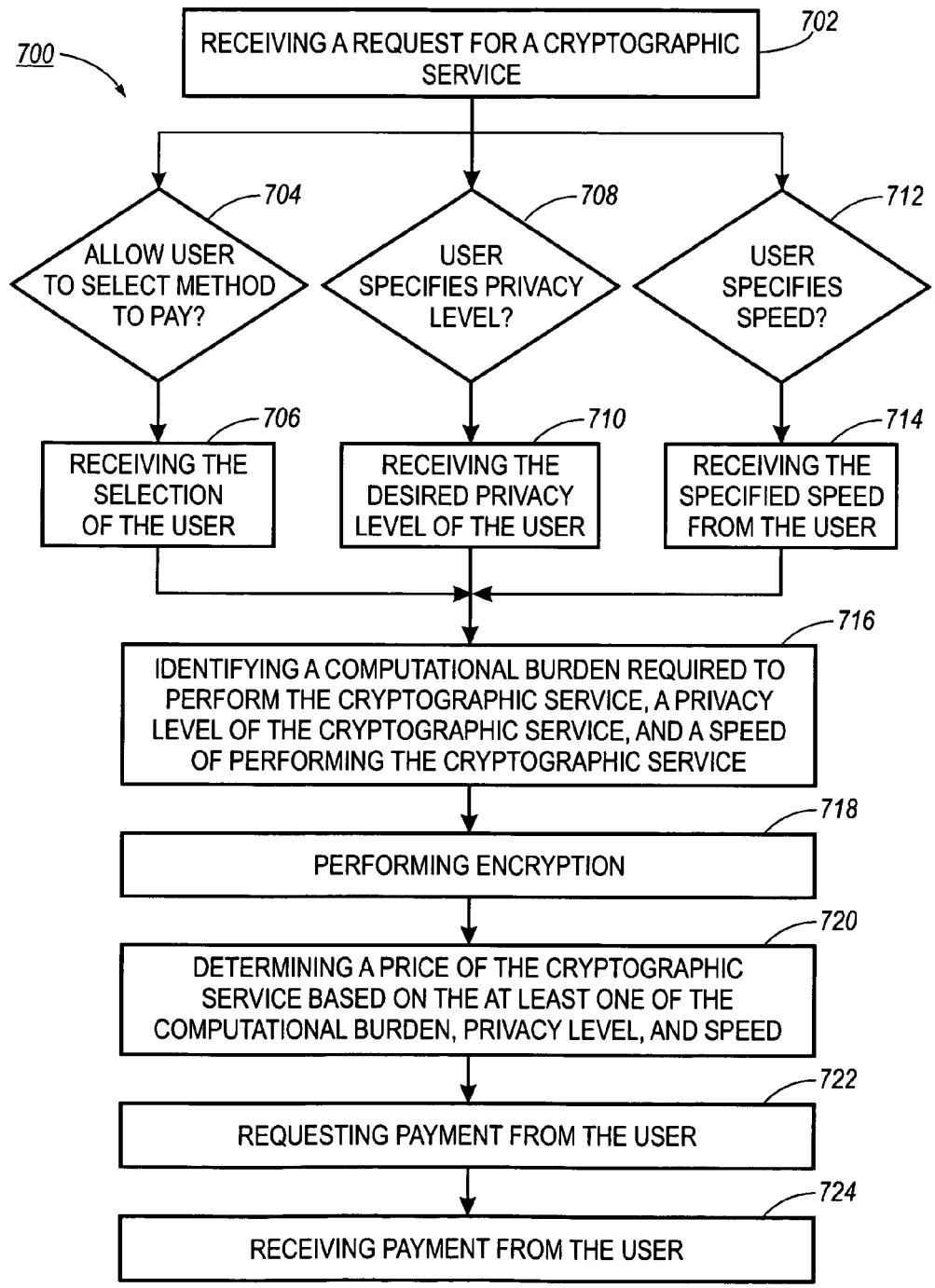
FIG. 7 is a flowchart of a process for pricing a cryptographic service according to one embodiment of the present invention.

FIG. 7 is a flowchart of a process 700 for pricing a cryptographic service according to one embodiment of the present invention. The present invention provides a way of addressing the costs of privacy, by using a pricing mechanism to guide the user to the right level of resource usage. The present invention also provides a new business model for secure services, where a protocol participant pays for computations in a privacy-scaling manner. In operation 702, a request for a cryptographic service is received from a user. Such a "user" can be a person, business, computer executing a computer program, etc. In optional decision 704, the user can be allowed to select to pay based on a computational burden required to perform the cryptographic service, a privacy level of the cryptographic service, and/or a speed of performing the cryptographic service. If the user is allowed to select to pay based on the computational burden, the privacy level, and/or the speed, the user's selection is received in operation 706.

In optional decision 708, the user can be allowed to specify the privacy level of a high level cryptographic service. Thus, the user has control of the tradeoffs that are inherent in many privacy protocols. This is particularly useful where a user wishes to utilize different levels of privacy for different data. This also allows different users to specify their preferred levels of privacy. If the user is allowed to specify the privacy level, the user's desired level of privacy is received in operation 710. In optional decision 712, the user can be allowed to specify the speed of performing the cryptographic service. In this way, a user wishing to send large quantities of data can help specify how quickly the data can be encrypted and sent. If the user is allowed to specify the speed, the user's desired speed is received in operation 714. It should be kept in mind that any combination of the functions of operations 704, 708, and 712 can be performed for any user utilizing the process of the present invention.

With continued reference to FIG. 7, in operation 716, an identification is made of the computational burdens required to perform the cryptographic service, the privacy level of the cryptographic service, and/or the speed of performing the cryptographic service. The encryption is performed in operation 718. A price of the cryptographic service is determined in operation 720 based on the computational burden, privacy level, and/or speed. Payment for the cryptographic service can be requested and received from the user in operations 722 and 724, respectively. In one application of the present invention, the process of FIG. 7 can be used for pricing cryptographic services in networked business applications. There are a number of security protocols for which the degree of privacy scales nearly linearly with the computational burden. Following are three examples:

1. Private Information Retrieval

Figure 8:
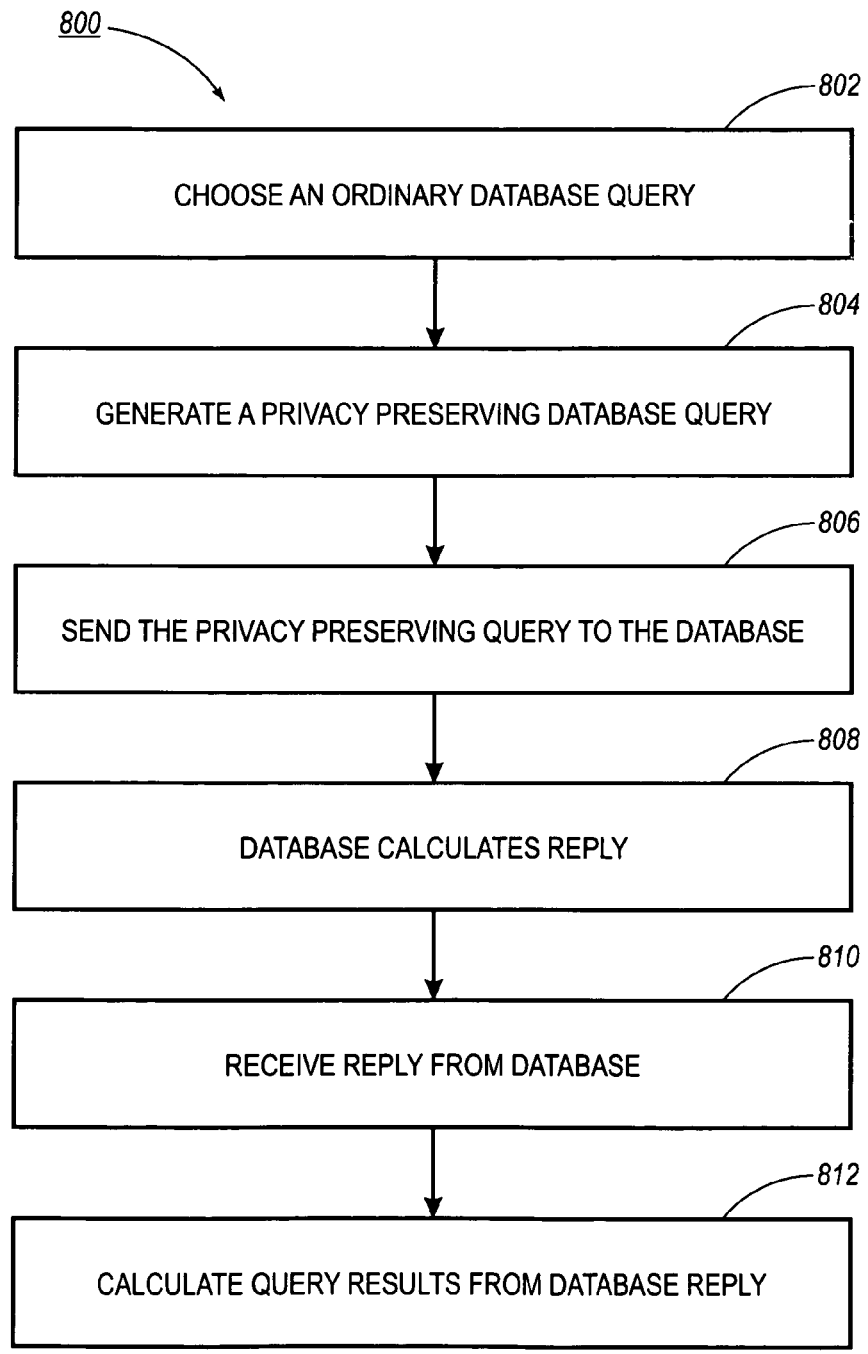
FIG. 8 illustrates a process for hiding a query to a database in accordance with an embodiment of the present invention.

FIG. 8 illustrates a process 800 for hiding a query to a database. Imagine that the database is a long string of bits, and the querier wants to know the value of the jth bit. In accordance with a preferred embodiment, the querier can learn the value of the jth bit, while the database never learns the value of "j". In operation 802, a database query or other type of query is received. The querier prepares a special modulus N and a random base x. The modulus is the product of two large primes p and q. The primes are selected so that a certain small prime divides p−1 or q−1. Exactly which prime is selected is kept hidden from the database. The privacy of the scheme rests on the assumption that it is difficult to determine from N what the small factors of p−1 and q−1 are. This is a new hardness assumption for cryptography, but it is a plausible one. Of course, if one knew the factorization of N then it would be easy to determine the small factors of p and q, so this new assumption is no harder than the well-known assumption that factoring is hard.

The querier generates the special modulus N and the random base x in operation 804. The particular small prime is used to encode the secret query j. The database computes a modular exponentiation using n and x, where the exponent is the product of a number of small primes. Exactly which small prime is selected is a function of the bits in the database that are ones and zeros. The final result is a single value which is no larger than N. The querier takes this final result and performs a test on it to determine the result of the query. The test is a modular exponentiation that uses the result of the query as the base. In operation 806, the querier's query is "hidden" among the set of m possible queries (i.e., placed in a batch with the other queries).

Notice that the result sent by the database is the size of a single number no larger than N no matter how large the database is. Notice that this compression in communication is achieved at the expense of an increase in computation by both parties. Specifically, both parties must perform modular exponentiations of a specific type. These are not modular exponentiations to encrypt, decrypt, sign or verify a signature. Instead, there are modular exponentiations in the service of a complex protocol to perform a sophisticated cryptographic service (private information retrieval). The queries are sent to the database or other data source in operation 808, and responses to the queries are received in operation 810.

It is possible to reduce the computation for the database by restricting the database to 100,000 elements and performing the private information retrieval over that set of bits. This hides the true query in a smaller set of possible queries. The communication size remains the same, but the computation that the database must perform is reduced. The computation that the database must perform is dominated by the cost of performing a modular exponentiation where the exponent is a product of as many small primes as there are ones in that portion of the database. The smaller the portion of the database within which the query is hidden, the fewer small primes in the exponent product, and thus the simpler the calculation for the database, which is referred to as "per-tree" pricing. This is very different from having the database simply retrieve 100,000 answers for the querier. It is a complex protocol for private information retrieval which restricts the possible queries over which the protocol takes place in order to reduce the computational burden on the service provider. The response to the query is separated from the responses in operation 812.

One such solution requires a database to perform the query and the database to each perform about m modular exponentiations, and reduces the communication to one round of messages of size log m. This example has many practical applications, such as allowing a user to get a real-time stock quote without revealing which stock he or she is interested in, or query a patent database without leaking the query to a competitor.

2. Group Authentication

According to an embodiment of the present invention, a participant proves to be one of a plausible set of m possible participants without revealing which, where m is a tunable parameter. There is also a non-interactive version of this called a "group signature". An illustrative cryptographic solution requires the participant and the verifier to each perform about m modular exponentiations, and exchange one round of communication of size proportional to m. This example has many practical applications, including to enhance the value of recommendation systems.

3. Mix Networks

According to one embodiment of the present invention, a participant can hide his or her message traffic among other participants' messages using a mechanism commonly known as a mix network. In an illustrative cryptographic solution the cost is about two hundred modular exponentiations per mix per ciphertext. This example has application whenever the fact that one user is communicating with another is revealing. Many other anonymity mechanisms (such as for anonymous payment, or group authentication) become worthless if there is no traffic confidentiality. The bulk of the computational burden for all participants in these examples can be offloaded to one or more independent cryptoservers, or to a service provider that has access to its own cryptoservers. It is natural to consider a pricing model where the participant pays by the degree of desired privacy.

In various embodiments of the present invention, the computations that are to be performed by the cryptoserver can be done generically (that is, data-independent pre-computation), or data-dependent but blindable (that is, in a way that sensitive information is concealed even from the cryptoservers), or data-dependent and information-leaking (that is, so that the cryptoserver must be trusted with sensitive information, although this information is still concealed from the other participants in the actual protocol). In all of these cases, a pricing model with offloaded computation to cryptoservers can be instituted, although the security assumptions for the participants will be different.

The private information retrieval schemes can be done generically. The group authentication schemes can be done in a way that is data-dependent but blindable. Some of the work for the mix networks can be done generically, while some must be data-dependent and information-leaking. However, note that the information being leaked to the cryptoservers in this case are ciphertexts, which threatens the confidentiality of the fact of the communication but not the contents.

Figure 9:
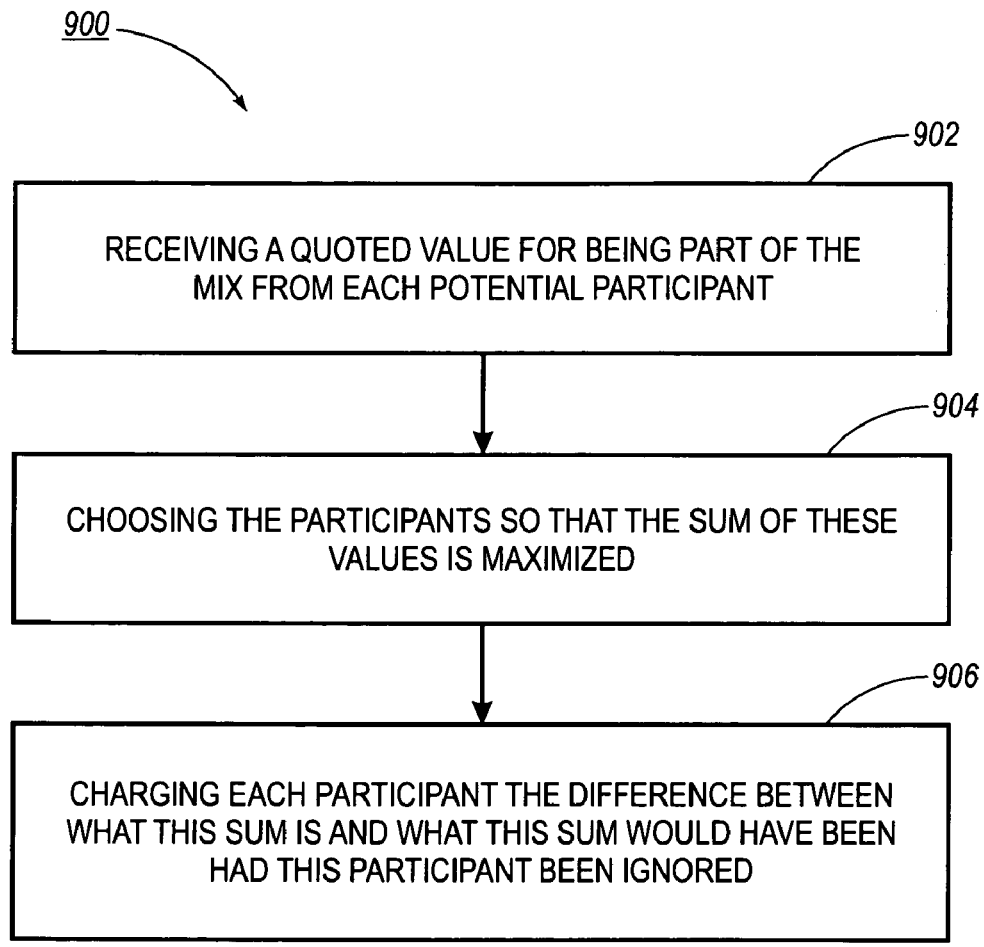
FIG. 9 is a flow diagram of a process for a Clarke Tax model according to one embodiment of the present invention.

For the example of a mix network, the participant's traffic might be hidden among dummy traffic, or among other participants' traffic. In the latter case, all participants in the mix gain traffic confidentiality. Therefore, a pricing mechanism can be crafted on a value-gained basis to extract more revenue. An appropriate (fair) pricing mechanism is the well known "Clarke Tax," which generalizes the second-price auction mechanism. The Clarke Tax is designed to encourage all participants to state their true evaluation rather than the strategic evaluation. FIG. 9 is a flow diagram of a process 900 for a Clarke Tax model according to one embodiment of the present invention. In operation 902, each potential participant quotes a value for being part of the mix. In operation 904, participants are chosen so that the sum of these values is maximized. In operation 906, each participant is charged the difference between what this sum is and what this sum would have been had this participant been ignored.

An embodiment of the present invention provides a business model where the user would pay on a steeply sliding scale according to the amount of compression that was desired. This is useful for bandwidth-critical applications such as transmission along a very expensive channel. Example applications include communication to spacecraft, or communication over low-power wireless devices. It is also useful for applications where signed data must be stored in a constrained location. Examples include signed authentication tokens or electronic cash to be stored on a smart card, or a signature to be stored as a small glyph on a page.

Figure 10:
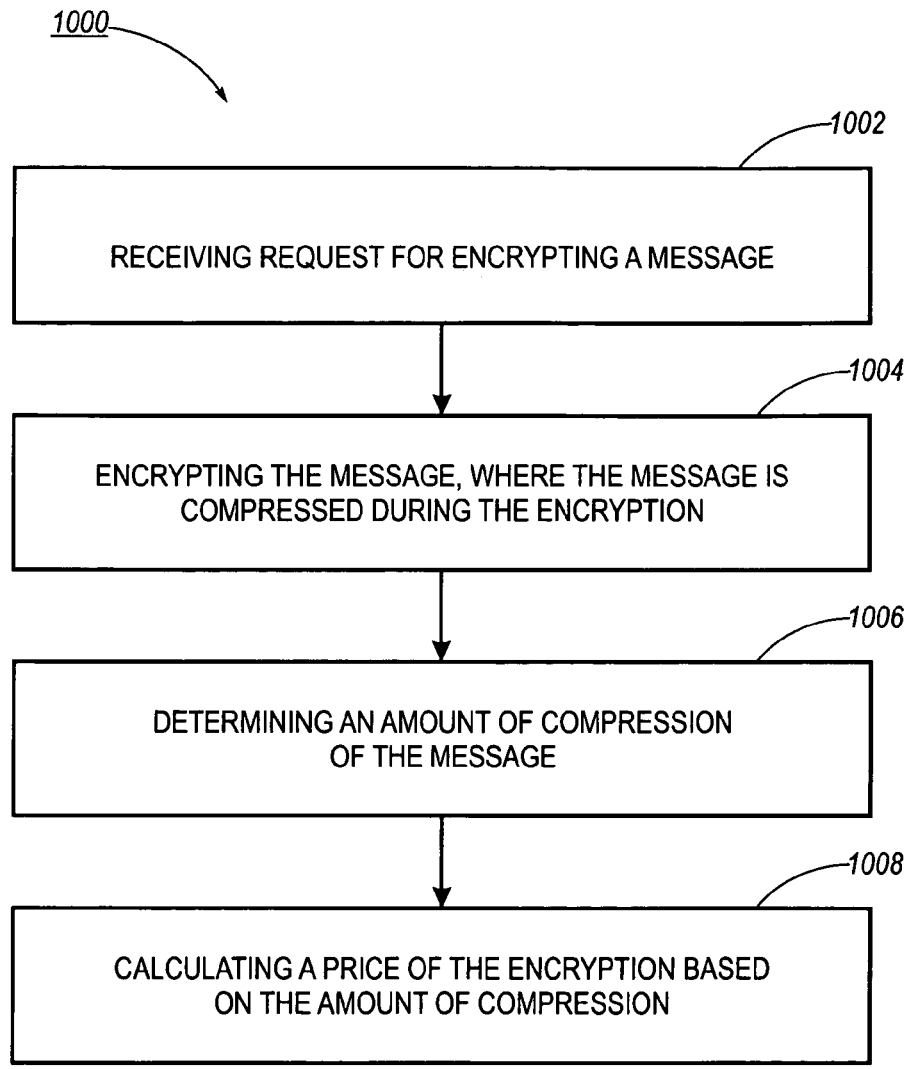
FIG. 10 is a flowchart of a process for pricing a cryptographic service based on a compactness of a cryptographic message in accordance with an embodiment of the present invention.

FIG. 10 is a flowchart of a process 1000 for pricing a cryptographic service based on a compactness of a cryptographic message. In operation 1002, a request for encrypting a message, which can include other data, is received. In operation 1004, the message is encrypted and is also: compressed during the encryption. As an option, the encryption can utilize random bits. An amount of compression of the message is determined in operation 1006. In operation 1008, a price of the encryption is determined based on the amount of compression.

Figure 11:
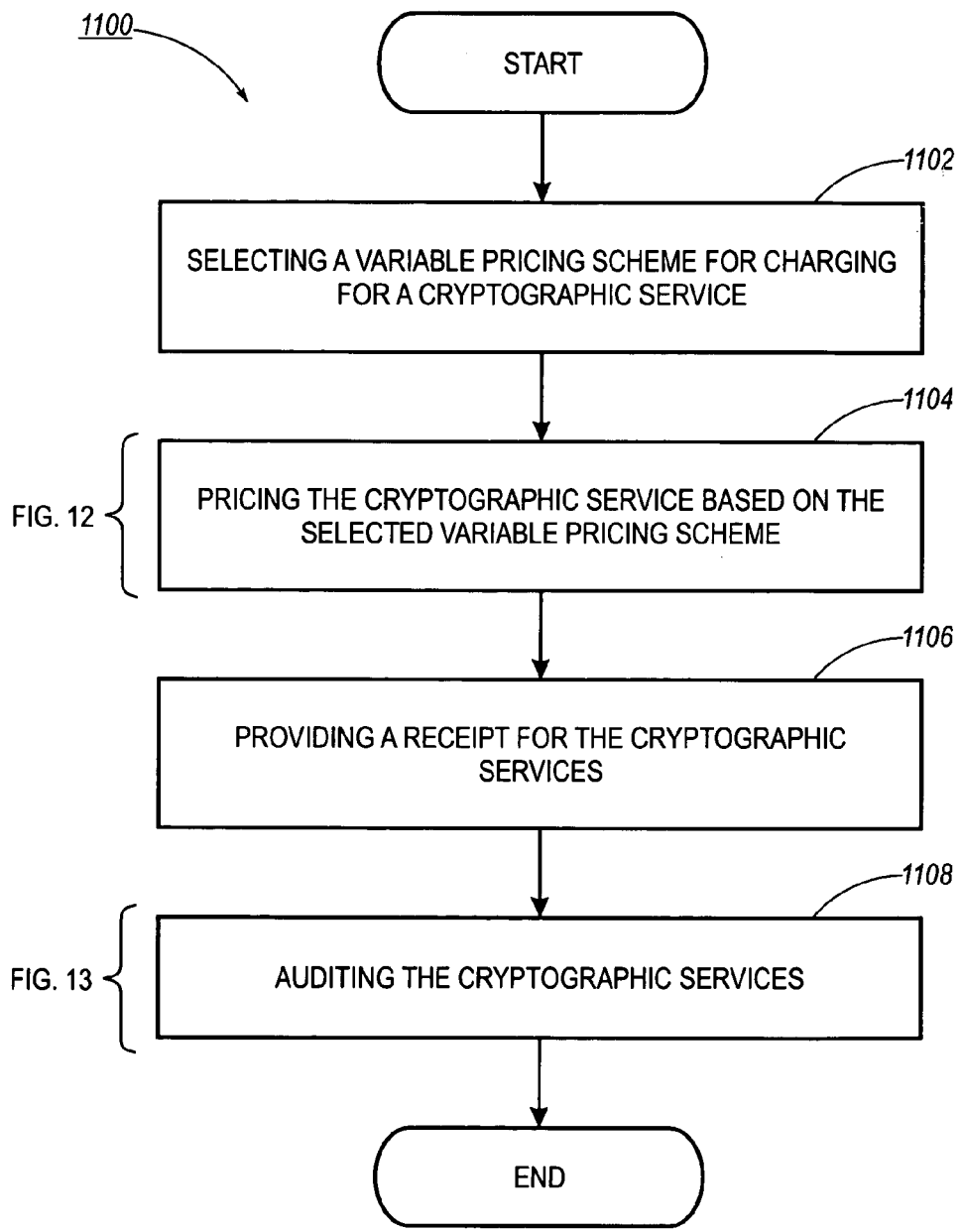
FIG. 11 is a flowchart of a process for enhancing competition among cryptoservers in accordance with a preferred embodiment.

FIG. 11 is a flow diagram illustrating a process 1100 for making competition among cryptoservers more effective. In operation 1102, a variable pricing scheme is selected for charging for a cryptographic service. A network-based cryptographic service is priced using the selected variable pricing scheme in operation 1104. A receipt for the services is provided in operation 1106. In operation 1108, the cryptographic service is audited.

Variable Pricing

Figure 12:
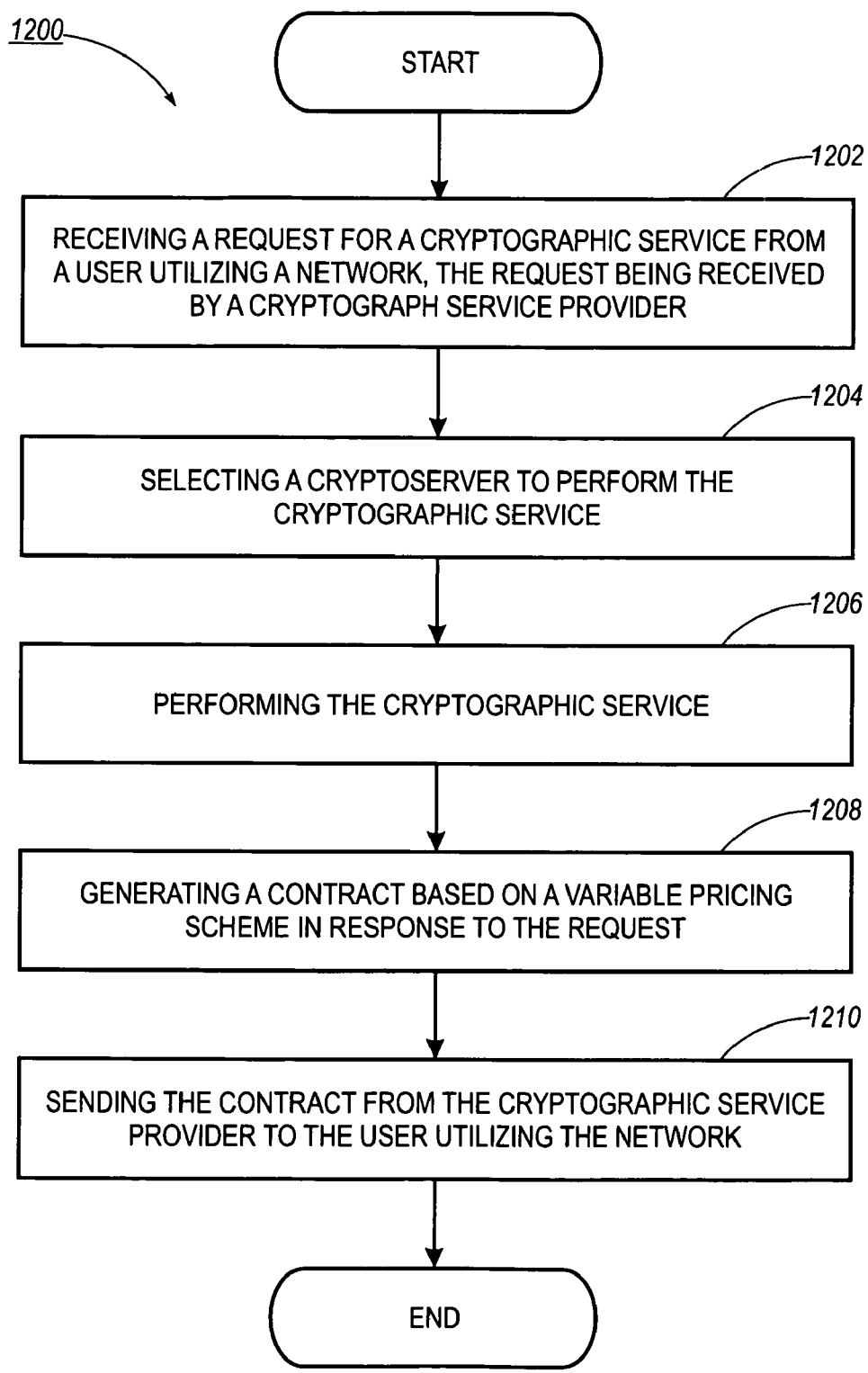
FIG. 12 is a flowchart depicting a process for pricing a cryptographic service on a network utilizing one or more cryptoservers in accordance with a preferred embodiment.

FIG. 12 is a flowchart depicting a process 1200 for pricing a cryptographic service on a network utilizing one or more cryptoservers. In operation 1202, a request for a cryptographic service is received from a user utilizing a network. The request is received by a cryptographic service provider. The cryptographic service provider can be, for example, an entity in communication with the cryptoservers. In operation 1204, the cryptographic service provider can select one or more of a plurality of cryptoservers, including its own cryptoserver, to perform the cryptographic service.

The cryptographic service is performed in operation 1206. In operation 1208, a contract is generated based on a variable pricing scheme in response to the request.

In operation 1210, the contract is sent from the cryptographic service provider to the user utilizing the network.

Variable pricing is a mechanism that is effective for cases (a) and (b). The price that a cryptoserver sets can depend on how idle it is at the moment or at the future time of the contracted service, how far away it is in the network, the current congestion in the network, how reliable and confidential the cryptoserver has been in the past (based on recommendation systems as discussed elsewhere in the specification), and other factors.

Auctions are an alternative pricing mechanism that can be either demand-driven (bids by customers for cryptoservice) or supply-driven (bids by cryptoservers for jobs). More generally, markets are-possible for generic cryptocommodities, including futures contracts. These pricing mechanisms have the effect of creating a more equitable market for the consumer in case (a). In case (b), the effect is to create incentives that will lead rational consumers to balance the load more effectively among the various cryptoservers of the distributed service.

Note that the auctions (or markets) can be conducted securely as a cryptographic protocol by one or more of the cryptoservers. This would allow the participants a high degree of assurance and privacy, while offloading most of the computational burden. Of course, this would be advantageous when bidding for jobs that were significantly larger than the cost of executing the secure auction protocol itself (e.g., following one common approach from the literature about k n log n modular multiplications, where k is the number of auction participants, and n is the number of bits in the bidding range).

Recommendation System

Recommendation systems can be helpful for keeping track of the past reliability, speed and confidentiality of cryptoservers. Any number of generic recommendation systems for generic services can be adapted to this scenario. Of special interest are approaches that exploit the nature of the cryptoservice. For example, a cryptoserver can give every customer a receipt for every job, digitally signed at a tiny extra cost (i.e., a fraction of the computational burden of the job itself). The receipt can include such information as a one-way hash of the results of its computations, the time and duration of the computations, a description of the computations, the identities or pseudonyms of the cryptoserver and the customer. These signed receipts are useful to back up claims or complaints by customers in a non-repudiable manner.

Auditing

Auditing can help establish the past reliability, speed and confidentiality of cryptoservers. Here too, any generic method for auditing any on-line service could be used, but there are special opportunities for auditing a cryptoservice. One embodiment of the present invention has two or more auditors use a secure distributed protocol to generate a signing key, and which give that key to a cryptoservice in a way that no single auditor knows what it is. The auditors could then try to have the cryptoservice sign a known set of messages using that key. Any other signed message using that key would be a strong indication that the cryptoserver failed, because the only alternative explanations would be that the key was cracked (e.g., the RSA modulus was factored) or that some threshold number of auditors colluded.

Figure 13:
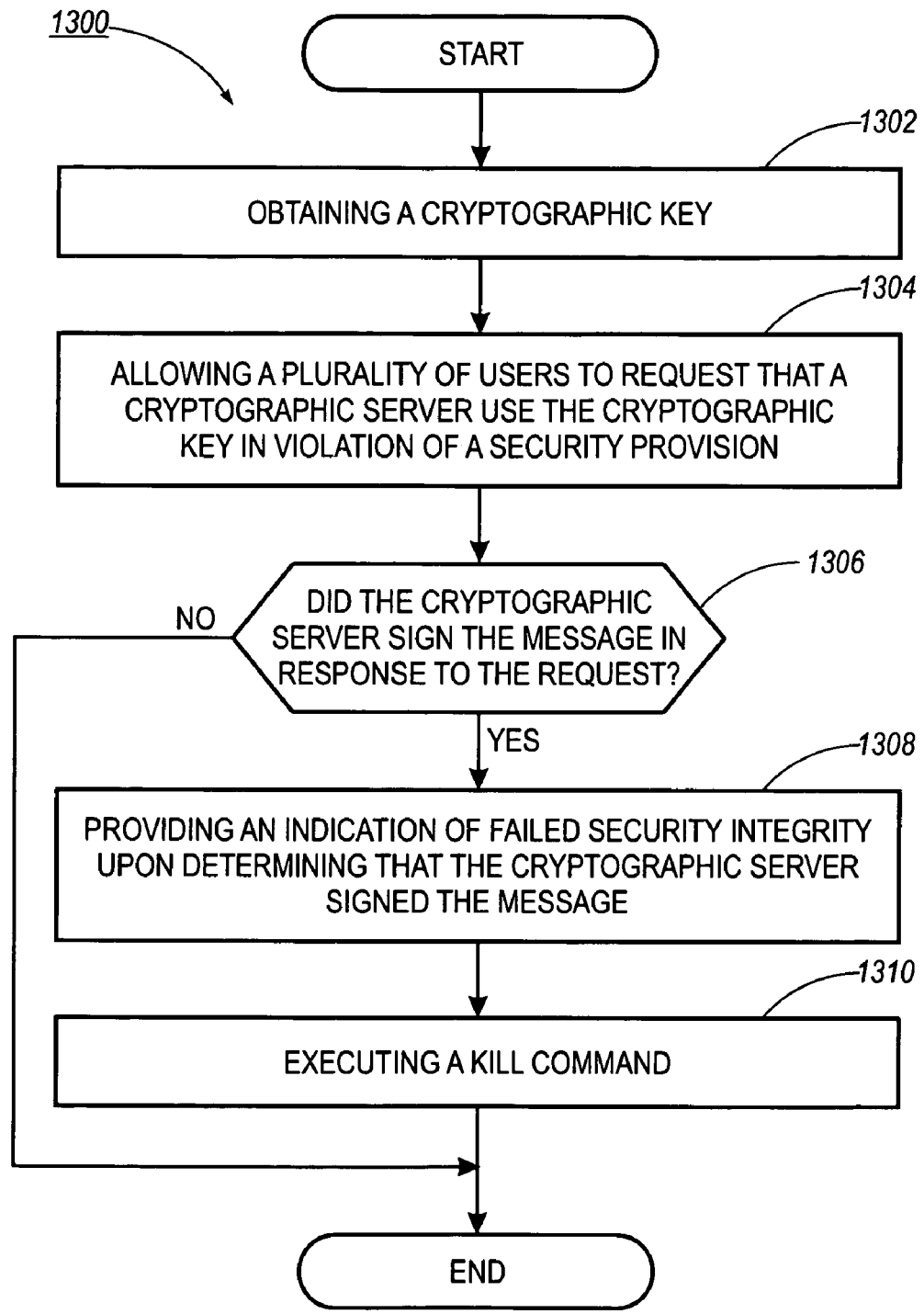
FIG. 13 is a flow diagram of a process for auditing a security provision on a network utilizing a cryptoserver in accordance with a preferred embodiment.

FIG. 13 is a flow diagram of a process 1300 for auditing a security provision on a network utilizing a cryptoserver. An example of such a security provision relates to access control of the cryptoserver and/or integrity of the cryptoserver. In operation 1302, a cryptographic key is obtained such as by obtaining a key from a trusted source or generating a key. In the operation 1304, a plurality of users are allowed to request that a cryptoserver use the cryptographic key to sign a message in violation of a security provision. Such users can be system operators or administrators, other cryptoservers, and/or programs executed by the cryptoserver, for example. In operation 1306, it is determined whether the cryptoserver signed the message in response to the request. An indication of failed security integrity is provided in operation 1308 upon determining that the cryptographic server has signed the message. As an option, a kill command can be executed by the cryptoserver in operation 1310 upon receiving the indication of failed security integrity, as discussed in more detail below.

Another embodiment of the present invention makes use of Lipton's notion of "uncheatable benchmarks" that are moderately hard to compute but easy to verify, as known to those skilled in the art. In one of Lipton's constructions, the cryptoserver must perform m modular exponentiations where m is a tunable parameter, while the entire computation can be verified with only two modular exponentiations. This is based on RSA computations, where the verifier knows the factorization of the modulus. Here again, the use of distributed key generation by two or more auditors makes these benchmark tests even more credible.

Figure 14:
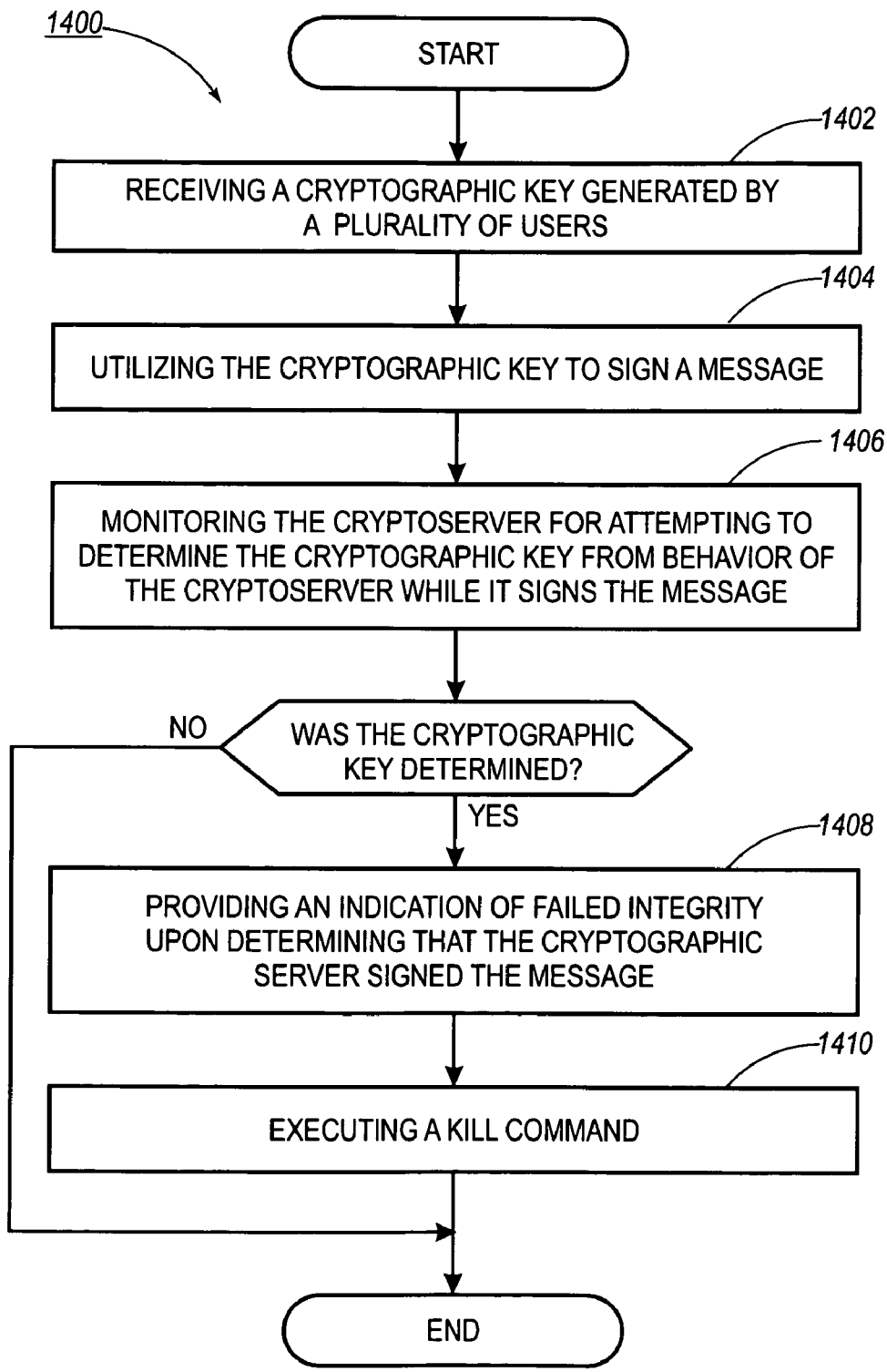
FIG. 14 is a flowchart illustrating a process for auditing a security provision of a cryptographic service on a network utilizing a cryptoserver in accordance with a preferred embodiment.

Another embodiment of the present invention that benefits from distributed key generation-checks for the presence of unintentional emmission channels in the cryptoservers. FIG. 14 is a flowchart illustrating a process 1400 for auditing a security provision of a cryptographic service on a network-utilizing a cryptoserver. Again, the security provision can relate to access control and/or integrity of the cryptoserver, for example. In operation 1402, a cryptographic key that is generated by two or more users is received by a cryptoserver and, in operation 1404, is utilized to sign a message. Again, the users can be system operators or administrators, other cryptoservers, and/or programs executed by the cryptoserver, for example. In operation 1406, the cryptoserver is monitored and one or more attempts are made to determine the cryptographic key from behavior of the cryptoserver while the cryptoserver signs the message. Preferably, the cryptoserver is monitored by another, independent user. If the cryptographic key is determined, a notification of failed integrity is sent to the cryptoserver in operation 1408. The notification can be generated by the user monitoring the cryptoserver. A kill command can be executed by the cryptoserver in operation 1410 upon receiving the indication of failed security integrity, as described below.

Particularly for scenario (c), in which cryptoservers are autonomous or semi-autonomous and trying to self-govern, it is desirable to design a loosely coupled distributed network of cryptoservers that monitor each other's performance. The monitoring can be done by having the cryptoservers themselves act as recommenders or auditors as described elsewhere in this specification. It is possible to have cryptoservers designed to respond to a suitably formatted kill command, which would cause them to delete some or all of their stored keys, for example, and/or shut down some or all of their functionality. For example, a suitable kill command might need to be signed by a threshold number of other cryptoservers. This protects against routine discovery of a poorly functioning cryptoserver in a decentralized environment. A variation of this scenario can have the cryptoserver audit itself, and issue a kill command if its computations did not pass its verification tests.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for pricing a cryptographic service, comprising:
   (a) receiving a request for a cryptographic service;
   (b) identifying a computational burden required to perform the cryptographic service, including one or more of a privacy level of the cryptographic service or a speed of performing the cryptographic service; and (c) determining a price of the cryptographic service based on the at least one of computational burden, privacy level, and speed.

2. The method as recited in claim 1, wherein a user requesting the cryptographic service specifies the privacy level.

3. The method as recited in claim 1, wherein a user requesting the cryptographic service specifies the speed of performing the cryptographic service.

4. The method as recited in claim 1, further comprising requesting payment for the cryptographic service from a user requesting the cryptographic service.

5. The method as recited in claim 1, wherein the cryptographic service includes utilizing private information retrieval.

6. The method as recited in claim 1, wherein the cryptographic service includes utilizing group authentication.

7. The method as recited in claim 1, wherein the cryptographic service includes utilizing mix networks.

8. A computer program embodied on a computer readable medium for pricing a cryptographic service, comprising:
   (a) a code segment that receives a request for a cryptographic service;
   (b) a code segment that identifies a computational burden required to perform the cryptographic service, including one or more of privacy level of the cryptographic service or speed of performing the cryptographic service; and
   (c) a code segment that determines a price of the cryptographic service based on at least one of computational burden, privacy level, and speed.

9. The computer program as recited in claim 8, wherein a user requesting the cryptographic service specifies the privacy level.

10. The computer program as recited in claim 8, wherein a user requesting the cryptographic service specifies the speed of performing the cryptographic service.

11. The computer program as recited in claim 8, further comprising a code segment that requests payment for the cryptographic service from a user requesting the cryptographic service.

12. The computer program as recited in claim 8, wherein the cryptographic service includes utilizing private information retrieval.

13. The computer program as recited in claim 8, wherein the cryptographic service includes utilizing group authentication.

14. The computer program as recited in claim 8, wherein the cryptographic service includes utilizing mix networks.

15. A system for pricing a cryptographic service, comprising;
   (a) logic that receives a request for a cryptographic service;
   (b) logic that identifies a computational burden required to perform the cryptographic service, including one or more of a privacy level of the cryptographic service or a speed of performing the cryptographic service; and
   (c) logic that determines a price of the cryptographic service based on the at least one of the computational burden, privacy level, and speed.

16. The system as recited in claim 15, wherein a user requesting the cryptographic service specifies the privacy level.

17. The system as recited in claim 15, wherein a user requesting the cryptographic service specifies the speed of performing the cryptographic service.

18. The system as recited in claim 15, further comprising logic that requests payment for the cryptographic service from a user requesting the cryptographic service.

19. The system as recited in claim 15, wherein the cryptographic service includes utilizing private information retrieval.

20. The system as recited in claim 15, wherein the cryptographic service includes utilizing group authentication.

21. The system as recited in claim 15, wherein the cryptographic service includes utilizing mix networks.

* * * * *

UNITED STATES PATENT AND TRADEMARK OFFICE
CERTIFICATE OF CORRECTION

PATENT NO. : 7,421,583 B1 Page 1 of 1
APPLICATION NO. : 09/596924
DATED : September 2, 2008
INVENTOR(S) : Thomas A. Berson et al.

It is certified that error appears in the above-identified patent and that said Letters Patent is hereby corrected as shown below:

Title page, item [73] Assignee: please insert --XEROX CORPORATION, Norwalk, CT--.

Signed and Sealed this

Twenty-third Day of December, 2008

JON W. DUDAS
*Director of the United States Patent and Trademark Office*